United States Patent
Kumada et al.

(10) Patent No.: US 8,067,123 B2
(45) Date of Patent: Nov. 29, 2011

(54) FUEL CELL SYSTEM AND SHUTDOWN METHOD OF THE SAME

(75) Inventors: Mitsunori Kumada, Yokosuka (JP);
Ryoichi Shimoi, Yokohama (JP);
Hayato Chikugo, Yokosuka (JP);
Takashi Fukuda, Yokohama (JP);
Kazuhiro Kageyama, Yokohama (JP);
Akira Matsunaga, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 749 days.

(21) Appl. No.: 12/164,729

(22) Filed: Jun. 30, 2008

(65) Prior Publication Data
US 2009/0035630 A1 Feb. 5, 2009

(30) Foreign Application Priority Data

Jul. 31, 2007 (JP) ................................ 2007-199088

(51) Int. Cl.
*H01M 8/04* (2006.01)
*H01M 8/10* (2006.01)
*H01M 8/22* (2006.01)

(52) U.S. Cl. ......... 429/429; 429/444; 429/483; 429/505
(58) Field of Classification Search .................. 429/429, 429/432, 444, 431, 468, 456, 462, 483, 505
See application file for complete search history.

(56) References Cited

U.S. PATENT DOCUMENTS

| | | | |
|---|---|---|---|
| 2002/0164508 A1* | 11/2002 | Wheat et al. | 429/22 |
| 2002/0182456 A1 | 12/2002 | Condit et al. | |
| 2004/0001980 A1 | 1/2004 | Balliet et al. | |
| 2005/0031917 A1 | 2/2005 | Margiott et al. | |
| 2005/0260471 A1* | 11/2005 | Logan et al. | 429/23 |
| 2005/0271911 A1* | 12/2005 | Kuriki et al. | 429/13 |
| 2006/0188765 A1* | 8/2006 | Matsuzaki et al. | 429/23 |
| 2008/0038595 A1 | 2/2008 | Buchi et al. | |

FOREIGN PATENT DOCUMENTS

| | | |
|---|---|---|
| JP | 2005-158555 A | 6/2005 |
| JP | 2006-073376 A | 3/2006 |
| WO | WO 2005/099016 A2 | 10/2005 |
| WO | WO 2006/012954 A1 | 2/2006 |

OTHER PUBLICATIONS

Machine Translation of: JP 2006/073376 A, Tsuchino et al., Mar. 16, 2006.*

* cited by examiner

*Primary Examiner* — Jonathan Crepeau
*Assistant Examiner* — Kenneth Douyette
(74) *Attorney, Agent, or Firm* — Foley & Lardner LLP

(57) ABSTRACT

At shutdown of a fuel cell system, a system-shutdown controller is configured to cause a current extraction device to extract current from a fuel cell in a state where a supply of a fuel gas through a fuel supply system is continued and a supply of an oxidant gas through an oxidant supply system is stopped, and the system-shutdown controller is configured to airtightly close fresh-air control valves after increasing pressure of the fuel gas in a fuel electrode to not less than atmospheric pressure and not less than pressure of the oxidant gas in an oxidant electrode.

11 Claims, 13 Drawing Sheets

FIG. 8
(a)
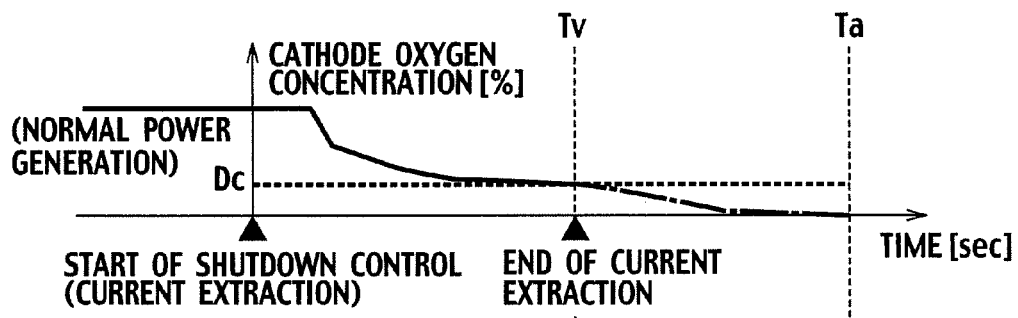
(b)
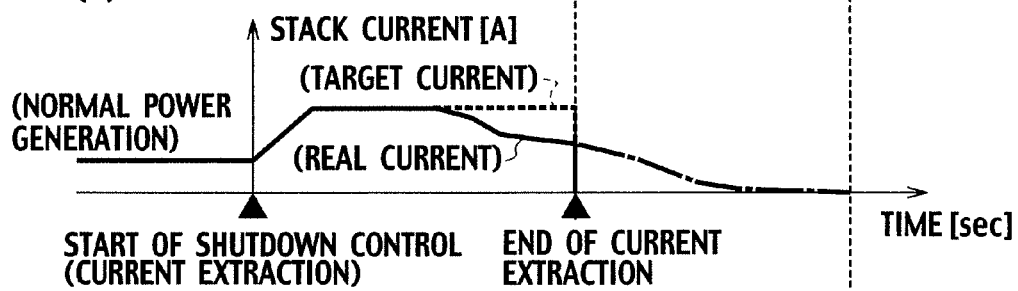
(c)
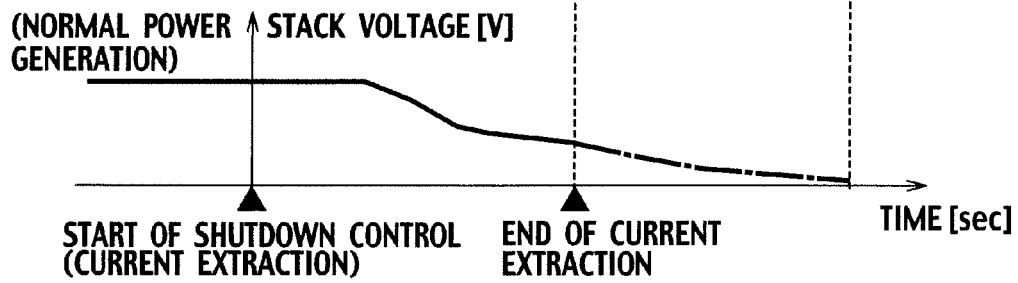

FIG. 10
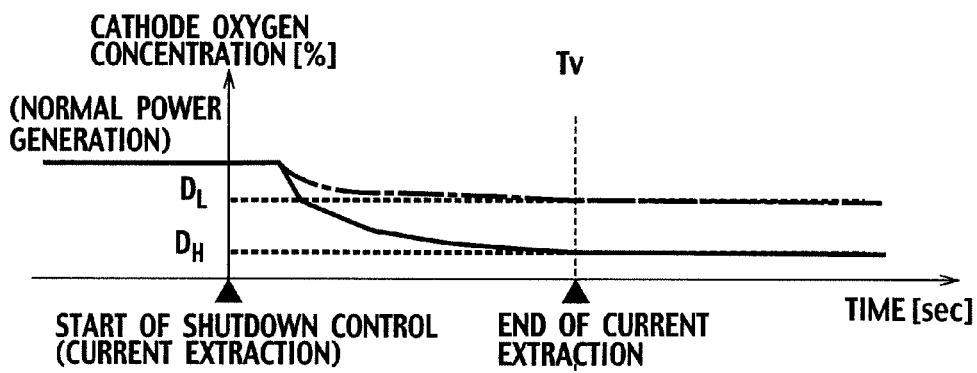
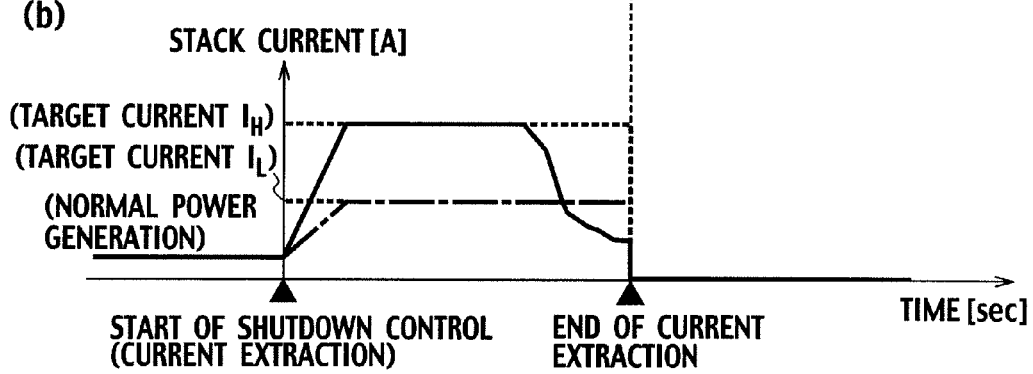
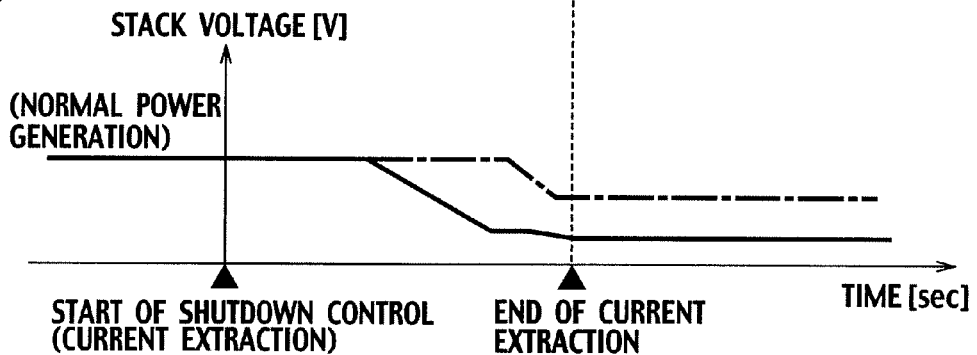

FIG. 12
(a)
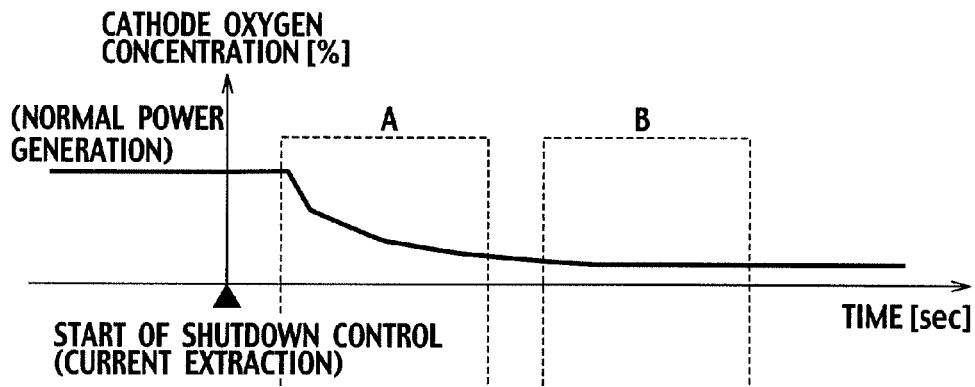
(b)
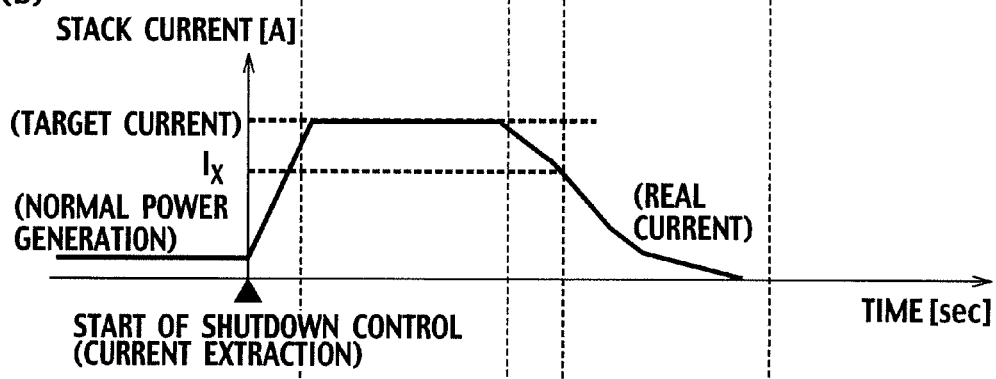
(c)
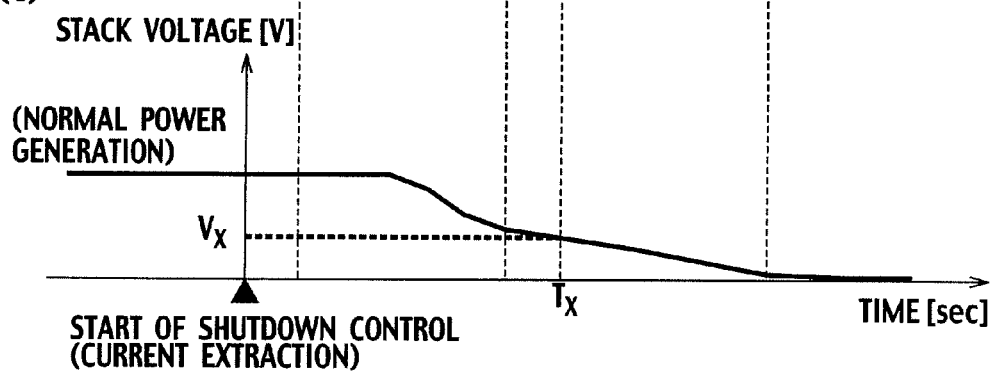

FUEL CELL SYSTEM AND SHUTDOWN METHOD OF THE SAME

BACKGROUND OF THE INVENTION

1. Field of the Invention

The present invention relates to a fuel cell system in which fuel gas and oxidant gas are supplied to a fuel cell to generate electricity and a shutdown method of the fuel cell system.

2. Description of the Related Art

A fuel cell system is a power generation system in which fuel gas containing hydrogen and oxidant gas containing oxygen are supplied to a fuel cell and are electrochemically reacted with each other for extraction of electrical power. Such a fuel cell system is used as power sources of fuel cell vehicles, for example.

With regard to this type of fuel cell system, the following matters are known. When fuel and oxidant electrodes of the fuel cell are filled with air because of ingress of air during a system leaving period while the operation of the fuel cell system is stopped (hereinafter, referred to as a system stop period), a boundary part of a gas composition called a hydrogen front is formed at the next start-up of the fuel cell system by air remaining at the fuel electrode and fuel gas newly supplied. The presence of the hydrogen front causes corrosion of a carbon support supporting a catalyst of platinum or the like, thus degrading the performance of the fuel cell. Accordingly, various start-up methods to prevent such degradation of the performance of the fuel cell have been studied.

Such degradation of the performance of the fuel cell is caused because the fuel and oxidant electrodes of the fuel cell are filled with air during the system stop period after the operation of the system stops. Accordingly, it is effective to address optimization of the condition of the fuel cell at stopping the operation the fuel cell system to avoid the aforementioned problem occurring at the start up of thereof.

Japanese Patent Unexamined Publication No. 2006-73376 describes a technique related to a system shutdown process for optimization of the condition of the fuel cell during the system stop period. The system shutdown process described in the above publication is as follows. At stopping the operation of the system, first, the fuel cell is disconnected from an external load and then connected to an internal discharge load. Supply of the oxidant gas to the oxidant electrode of the fuel cell is then stopped, and open-close valves provided at inlet and outlet sides of the oxidant electrode are closed. Current from the fuel cell is applied to the internal discharge load to consume oxygen at the oxidant electrode. The pressure at the fuel electrode of the fuel cell is then increased to bring the fuel and oxidant electrodes in a fuel gas atmosphere.

BRIEF SUMMARY OF THE INVENTION

In the system shutdown process of the aforementioned publication, first, an electric charge is consumed by the internal discharge load within the fuel cell with the oxidant electrode airtightly closed to consume oxygen remaining at the oxidant electrode. Simultaneously, the pressure of the fuel cell is increased to move the fuel gas from the fuel electrode to the oxidant electrode, thus bringing both the fuel and oxidant electrodes to the fuel gas atmosphere.

However, comparing a rate at which oxygen of the oxidant electrode is consumed with the consumption of the electric charge within the fuel cell to a rate at which the fuel gas moves from the fuel electrode to the oxidant electrode, the rate of movement of the fuel gas is normally slower than the consumption rate of oxygen. Accordingly, the difference in pressure between the fuel and oxidant electrodes becomes excessively large during a process in which the atmosphere at the oxidant electrode is changed from oxygen to hydrogen, which could adversely affect the electrolyte membranes. In order to avoid such a matter, the consumption rate of oxygen at the oxidant electrode needs to be made low by using the internal discharge load having high resistance for consumption of the electric charge with a small current, thus causing a problem of an increase in time taken for the system shutdown process.

The present invention was made in the light of the aforementioned conventional circumferences, and an object of the present invention is to provide a fuel cell system in which the degradation of the performance of the fuel cell is effectively suppressed and time required to stop operation of the fuel cell system can be shortened and to provide a method of stopping the fuel cell system.

The first aspect of the present invention provides a fuel cell system comprising: a fuel cell comprising: a fuel electrode; an oxidant electrode; and an electrolyte membrane, the fuel electrode and the oxidant electrode being opposed to each other with the electrolyte membrane interposed therebetween; a fuel supply system configured to supply a fuel gas to the fuel electrode, the fuel gas containing hydrogen; an oxidant supply system configured to supply an oxidant gas to the oxidant electrode, the oxidant gas containing oxygen; a pair of fresh-air control valves which are individually provided for inlet and outlet sides of the fuel cell in the oxidant supply system and is configured to prevent ingress of fresh air into the oxidant electrode; a current extraction device configured to extract current from the fuel cell during a system shutdown process; and a system-shutdown controller configured to integrally control the system shutdown process. At shutdown of the fuel cell system, the system-shutdown controller is configured to cause the current extraction device to extract current from the fuel cell in a state where the supply of the fuel gas through the fuel supply system is continued and the supply of the oxidant gas through the oxidant supply system is stopped, and the system-shutdown controller is configured to airtightly close the fresh-air control valves after increasing pressure of the fuel gas in the fuel electrode to not less than atmospheric pressure and not less than pressure of the oxidant gas in the oxidant electrode.

The second aspect of the present invention provides a shutdown method of a fuel cell system, the fuel cell system comprising: a fuel cell comprising: a fuel electrode; an oxidant electrode; and an electrolyte membrane, the fuel electrode and the oxidant electrode being opposed to each other with the electrolyte membrane interposed therebetween; a fuel supply system which supplies a fuel gas to the fuel electrode, the fuel gas containing hydrogen; an oxidant supply system which supplies an oxidant gas to the oxidant electrode, the oxidant gas containing oxygen; a pair of fresh-air control valves which are individually provided for inlet and outlet sides of the fuel cell in the oxidant supply system and prevent ingress of fresh air into the oxidant electrode, the method comprising: extracting current from the fuel cell in a state where the supply of the fuel gas through the fuel supply system is continued and the supply of the oxidant gas through the oxidant supply system is stopped; increasing pressure of the fuel gas in the fuel electrode to not less than atmospheric pressure and not less than pressure of the oxidant gas in the oxidant electrode; and after the extracting, airtightly closing the fresh-air control valves to prevent the ingress of the fresh air into the oxidant electrode.

BRIEF DESCRIPTION OF THE SEVERAL VIEWS OF THE DRAWING

FIG. 8 is a diagram explaining the fuel cell system according to the fourth embodiment, showing time variations of concentration of oxygen in the cathode, stack current, and stack voltage during the system shutdown process;

FIG. 10 is a diagram explaining a fuel cell system according to a fifth embodiment, showing time variations of concentration of oxygen in the cathode, stack current, and stack voltage during the system shutdown process;

FIG. 12 is a diagram explaining the fuel cell system according to the sixth embodiment, showing time variations of concentration of oxygen in the cathode, stack current, and stack voltage during the system shutdown process.

DETAILED DESCRIPTION OF THE INVENTION

Hereinafter, a description is given of concrete embodiments of the present invention in detail with reference to the drawings.

First Embodiment

Figure 1:
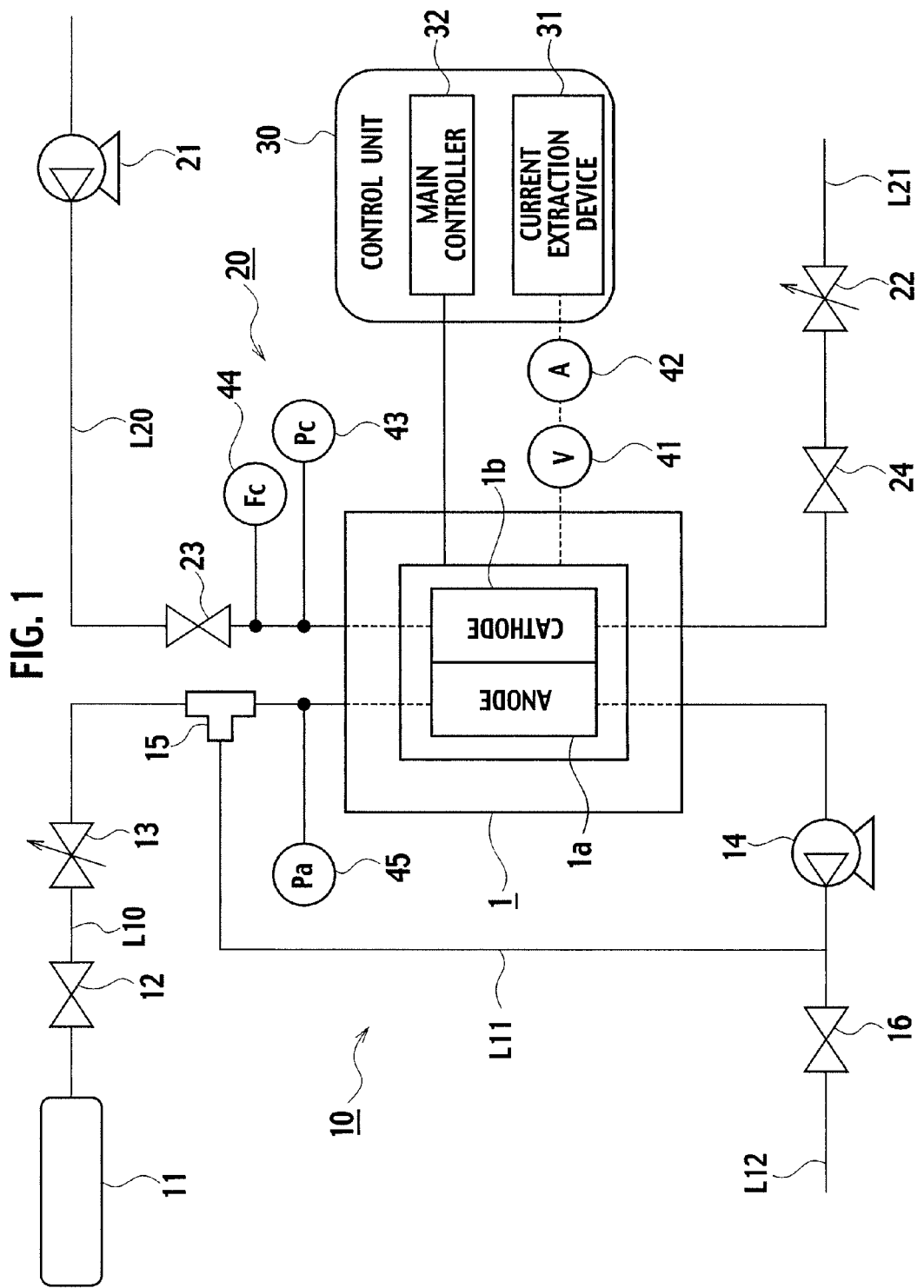
FIG. 1 is a schematic diagram showing a constitution of a fuel cell system according to a first embodiment of the present invention.

FIG. 1 is a configuration diagram of a fuel cell system according to a first embodiment of the present invention. The fuel cell system shown in the same drawing is, for example, mounted on a fuel cell vehicle as a power source and supplies electric power to loads including a drive motor of the vehicle and auxiliaries for fuel cell power generation. The fuel cell system includes a fuel cell stack 1 which is supplied with fuel gas and oxidant gas for power generation.

The fuel cell stack 1 includes, for example, a membrane electrode assembly sandwiched by separators, namely a single cell. The membrane electrode assembly includes a fuel electrode (hereinafter, referred to as an anode 1a) supplied with a fuel gas and an oxidant electrode (hereinafter, referred to as a cathode 1b) supplied with an oxidant gas, which are opposed to each other with a solid polymer electrolyte membrane interposed therebetween. The fuel cell stack 1 has a structure where a plurality of the fuel cells are stacked. In the fuel cell stack 1, the anode 1a and cathode 1b are supplied with the fuel gas and oxidant gas, respectively, which are electrochemically reacted with each other to generate electric power.

Herein, the fuel gas is gas containing hydrogen. In this embodiment, the fuel gas is assumed to be pure hydrogen. Accordingly, the fuel gas is just described as just hydrogen (for example, a hydrogen pressure regulator valve indicates a valve regulating supply pressure of fuel gas containing hydrogen). However, the fuel gas can be not only pure hydrogen but also various types of gas containing hydrogen. The oxidant gas is gas containing oxygen but is assumed to be air containing oxygen in this embodiment. Hereinafter, the oxidant gas is described as air. The oxidant gas is not limited to air. For example, in a system additionally including an oxygen tank with oxygen sealed therein, the oxygen supplied from the oxygen tank can be used.

In addition to the fuel cell stack 1, the fuel cell system includes a hydrogen system 10 for supplying hydrogen to the fuel cell stack 1, an air system for supplying air to the fuel cell stack 1, a control unit 30, and sensors 41 to 45.

The hydrogen system 10 is configured to supply hydrogen as the fuel gas from a fuel supply device (for example, a fuel tank as a high pressure hydrogen tank, a hydrogen storage alloy, or the like) through a fuel supply path L10 to the anode 1a of the fuel cell stack 1. Specifically, the fuel supply path L10 downstream of the fuel supply unit 11 is provided with a fuel supply valve 12. When the fuel supply valve 12 is opened, high pressure hydrogen gas from the fuel supply unit 11 is mechanically reduced in pressure to a predetermined pressure by a pressure reducing valve provided downstream of the fuel supply unit 11 (not shown). The hydrogen with pressure reduced is further reduced in pressure by a hydrogen pressure regulator valve 13, which is provided downstream of the pressure reducing valve, and then supplied to the anode 1a of the fuel cell stack 1. The open/close state of the fuel supply valve 12 is controlled by the control unit 30 depending on the need for supply of hydrogen to the fuel cell stack 1. The opening of the hydrogen pressure regulator valve 13 is controlled by the control unit 30 so that pressure of hydrogen supplied to the fuel cell stack 1 has a desired value (for example, an amount of hydrogen necessary for the electrochemical reaction).

Gas discharged from the anode 1a side of the fuel cell stack 1 (unused hydrogen and exhaust gas containing nitrogen and transmitted from the cathode 1b side) is discharged to a fuel circulation path L11. The other end of this fuel circulation path L11 is connected to the fuel supply path L10 downstream of the hydrogen pressure regulator valve 13. The fuel circulation path L11 is provided with a fuel circulating pump 14 and ejector 15. The fuel circulating pump 14 and ejector 15 circulate the hydrogen discharged from the outlet of the anode 1a of the fuel cell stack 1 to the inlet of the anode 1a. It is therefore possible to circulate and reuse unused hydrogen and reduce fuel consumption.

When the oxidant gas is air, nitrogen in air is transmitted from the cathode 1b to the anode 1a while power generation of the fuel cell stack 1 is continued. Accordingly, there is a tendency that the concentration of nitrogen in gas increases in the hydrogen system 10 while partial pressure of hydrogen decreases. The fuel circulation path L11 is therefore connected to the fuel discharge path L12 through which gas within the hydrogen system 10 is discharged to the outside. In other words, a part of the fuel circulation path L11 serves as the fuel discharge path L12 though which hydrogen discharged from the anode 1a of the fuel cell stack 1 is discharged to the outside. The fuel discharge path L12 is provided with a purge valve 16. By switching the open/close state of the purge valve 16, the exhaust gas flowing through the fuel circulation path L11 (gas containing nitrogen, unused hydrogen, and the like) is discharged to the outside. The open/close state of the purge valve 16 is controlled by the control unit 30 according to an operation state of the fuel cell stack 1. The purge valve 16 is basically controlled into a closed state and is switched from the close state to the open state when needed according to an estimation of the concentration of nitrogen or every predetermined period. Impurities such as nitrogen are purged from the hydrogen system 10 together with unused hydrogen, and the reduction of the partial pressure of hydrogen can be suppressed. Moreover, especially in the fuel cell system of this embodiment, the purge valve 16 is closed to prevent fresh air from flowing into the anode 1a of the fuel cell stack 1 through the fuel discharge path L12.

The air system 20 is configured to supply air as the oxidant gas through the air supply path L20 to the cathode 1b of the fuel cell stack 1. Specifically, for example, a compressor 21, which pressurizes air, is provided. The air pressurized by the compressor 21 is supplied through the air supply path L20 to the cathode 1b of the fuel cell stack 1. Gas discharged from the cathode 1b side of the fuel cell stack 1 (air with a part of oxygen consumed) is discharged to the outside through an air discharge path L21. The air discharge path L21 is provided with an air pressure regulator valve 22. An opening of the air pressure regulator valve 22 is controlled by the control unit 30 together with a drive amount (speed) of the compressor 21 so that the pressure and flow rate of air supplied to the fuel cell stack 1 have desired values.

Moreover, especially in the fuel cell system of this embodiment, the air system 20 is provided with an air inlet valve (a fresh-air control valve) 23 at an inlet of the cathode 1b of the fuel cell stack 1 and provided with an air outlet valve (a fresh-air control valve) 24 at an outlet of the cathode 1b of the fuel cell stack 1. The air inlet valve 23 is provided upstream of the inlet of the cathode 1b of the fuel cell stack 1, or on the air supply path L20. The air inlet valve 23 is closed while the operation of the fuel cell system is stopped, thus preventing ingress of fresh air into the cathode 1b of the fuel cell stack 1 from the air supply path L20. The air outlet valve 24 is provided downstream of the outlet of the cathode 1b of the fuel cell stack 1, or on the air discharge path L21. The air outlet valve 24 is closed while the fuel cell system is stopped, thus preventing ingress of fresh air into the cathode 1b of the fuel cell stack 1 from the air discharge path L21.

The control unit 30 includes a current extraction device 31 and a main controller (a system-shutdown controller) 32. The current extraction device 31 is controlled by the main controller 32 and is a device taking out current from the fuel cell stack 1 during the system shutdown process. The current extraction device 31 controls a current value or a voltage value at current extraction from the fuel cell stack 1.

The main controller 32 integrally controls the entire system. The main controller 32 monitors values detected by the sensors 41 to 45 and controls the components of the system according to a control program to control the operation state of the fuel cell stack 1. The system shutdown process, which is a characteristic of in the fuel cell system of this embodiment, is integrally controlled by the main controller 32.

The voltage sensor 41 measures voltage of the fuel cell stack 1, one of single cells constituting the fuel cell stack 1, or a cell group composed of a plurality of single cells. The current sensor (current meter) 42 measures current extracted from the fuel cell stack 1. The cathode pressure sensor 43 is provided for the air supply path L20 and detects pressure of a section between the air inlet and outlet valves 23 and 24 (hereinafter, referred to as a control section). The cathode flow rate sensor 44 is provided for the air supply path L20 and detects a flow rate of air supplied to the cathode 1b of the fuel cell stack 1. The anode pressure sensor 45 is provided for the fuel supply path L10 and detects pressure of hydrogen supplied to the anode 1a of the fuel cell stack 1.

The main controller 32 of the control unit 30 integrally controls operations of the hydrogen and air systems 10 and 20, opening and closing of the air inlet and outlet valves 23 and 24, extraction of current from the fuel cell stack 1 by the current extraction device 31 for shutdown of the fuel cell system to properly execute the system shutdown process in a short time. Specifically, at the shutdown of the fuel cell system, the main controller 32 stops the supply of air by the air system 20 while continuing the supply of hydrogen by the hydrogen system 10. In this state, the main controller 32 causes the current extraction device 31 to start the extraction of current from the fuel cell stack 1. Thereafter, the main controller 32 controls the hydrogen pressure regulator valve 13 of the hydrogen system 10 to set the pressure of the anode 1a side of the fuel cell stack 1 (hereinafter, referred to as anode pressure) to not less than atmospheric pressure and not less than pressure of the cathode 1b side (hereinafter, referred to as cathode pressure). The main controller 32 then closes the air inlet and outlet valves 23 and 24 to airtightly close the control section and thus prevents ingress of fresh air to the control section. After oxygen remaining in the cathode 1b side is sufficiently consumed by the current extraction from the fuel cell stack 1, the main controller 32 terminates the current extraction by the current extraction device 31 and stops the supply of hydrogen through the hydrogen system 10.

As described above, in the fuel cell system according to the first embodiment, according to control of the main controller 32, oxygen remaining in the cathode 1b side of the fuel cell stack 1 is sufficiently consumed while the air inlet and outlet valves 23 and 24 are closed to prevent ingress of fresh air into the control section. At the cathode 1b of the fuel cell stack 1, therefore, ingress of fresh air is prevented with the concentration of oxygen maintained low. Accordingly, it is possible to effectively avoid the problem of the degradation of the performance of the fuel cell stack 1 caused by air existing at the cathode 1b at the start-up of the fuel cell system. Moreover, the air inlet and outlet valves 23 and 24 are closed after the anode pressure is set to not less than atmospheric pressure and not less than the cathode pressure. It is therefore possible to increase the oxygen consumption rate at the cathode 1b without adversely affecting electrolyte membranes of the fuel cell stack 1 and shorten a period of time required to shut down the fuel cell system (hereinafter, referred to as a system shutdown time). Furthermore, since the anode pressure is set to higher than the cathode pressure, and hydrogen is secured enough to consume oxygen at the cathode 1b. It is therefore possible to set the value of current extracted from the fuel cell stack 1 high and further increase the oxygen consumption rate at the cathode 1b, thus further shortening the system shutdown time.

Furthermore, by setting the anode pressure higher than the cathode pressure, the amount of hydrogen transferred from the anode 1a to the cathode 1b is increased to increase the cathode pressure. It is therefore possible to more reliably prevent ingress of fresh air during the system shutdown time and further effectively prevent the problem of the degradation of the performance of the fuel cell stack 1.

Figure 2:
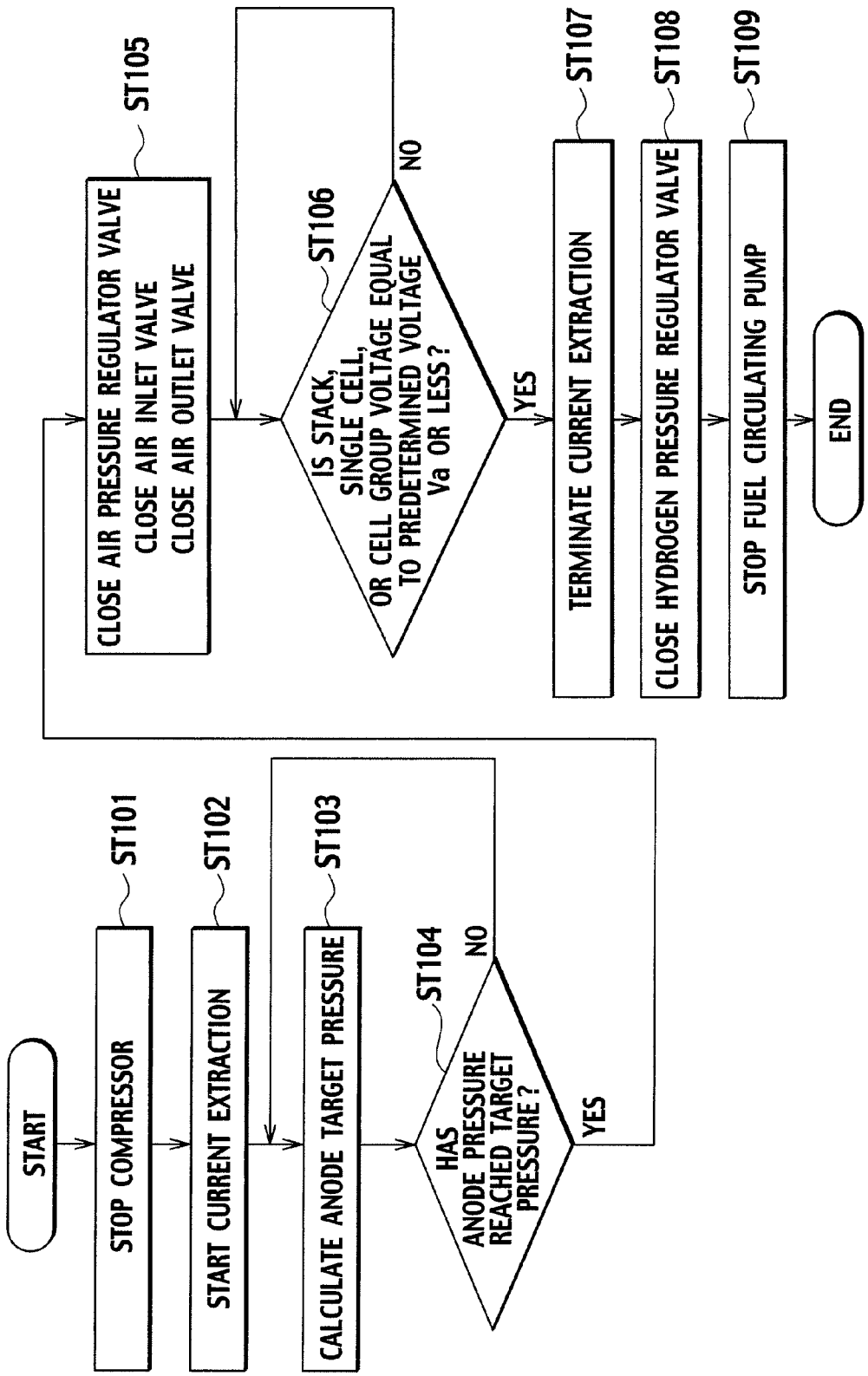
FIG. 2 is a flowchart showing a flow of a system shutdown process performed at shutting off the fuel cell system according to the first embodiment.
Figure 3:
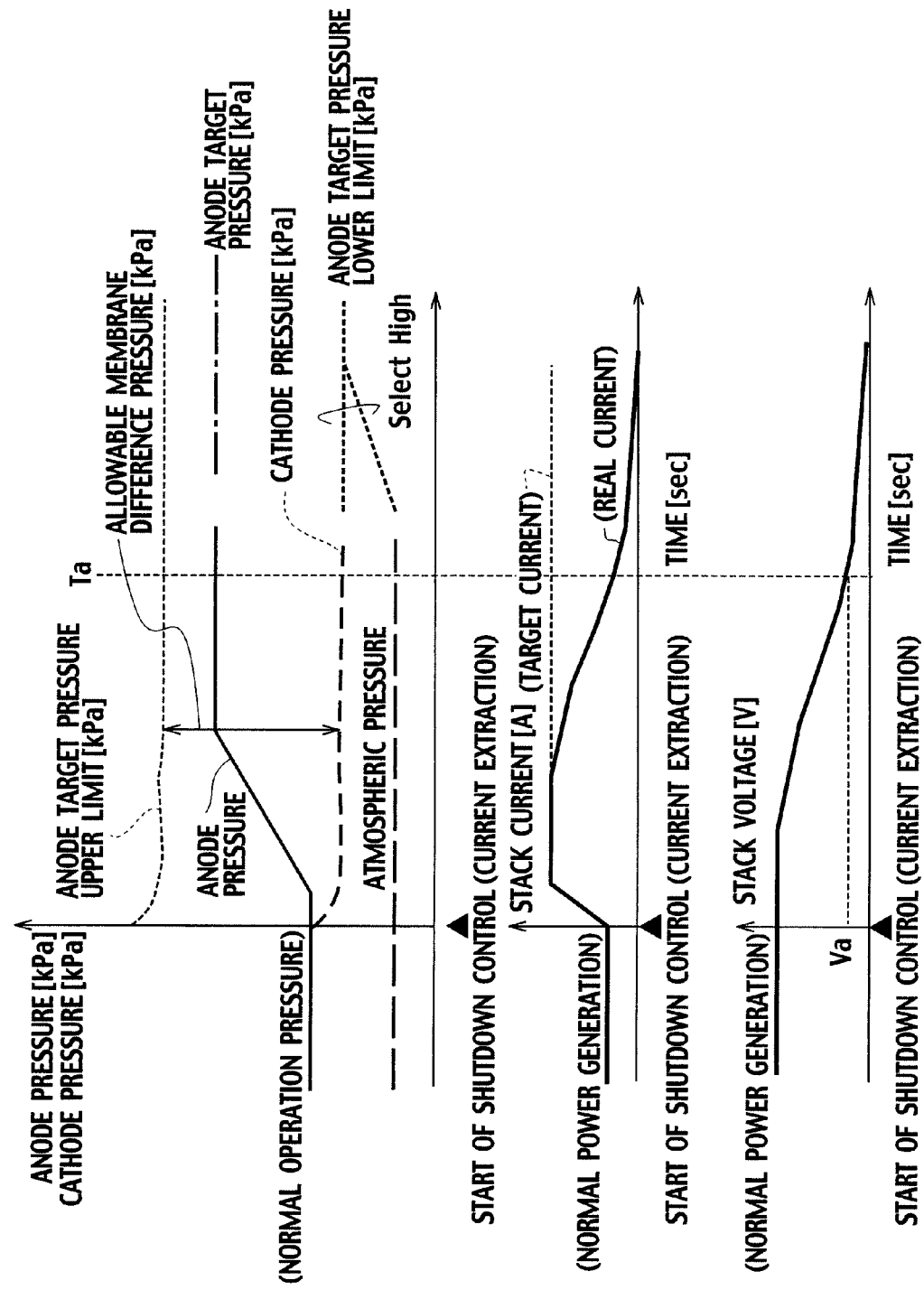
FIG. 3 is a diagram showing time variations of anode pressure, cathode pressure, stack current, and stack voltage of a fuel cell stack during the system shutdown process.

Next, a description is given of an operation of the fuel cell system according to the first embodiment with reference to FIGS. 2 and 3. FIG. 2 is a flowchart showing a flow of the system shutdown process at shutdown of the fuel cell system according to the first embodiment. FIG. 3 is a diagram showing time changes of the anode and cathode pressure and the stack current and voltage of the fuel cell stack 1 during the system shutdown process. At the start of the process shown in FIG. 2, it is assumed that the hydrogen pressure regulator valve 13 is opened at a predetermined opening and the purge valve 16 is closed. Moreover, it is assumed that: the fuel circulating pump 14 and compressor 21 are in operation; the air pressure regulator valve 22 is opened at a predetermined opening; and the air inlet and outlet valves 23 and 24 are opened.

At the shutdown of the fuel cell system, at first, the main controller 32 stops the operation of the compressor 21 of the air system 20 to stop supply of air to the fuel cell stack 1 (step ST101). The main controller 32 then causes the current extraction device 31 to start extraction of current from the fuel cell stack 1 (step ST102).

Next, the main controller 32 calculates the anode target pressure based on signals from the cathode and anode pressure sensors 43 and 45 (step ST103). The anode target pressure can be set to an arbitrary value considering sensor error and the like within an anode target pressure setting range as shown in FIG. 3. Herein, the lower limit of the anode target pressure setting range is the highest one of atmospheric pressure and cathode pressure. The upper limit of the anode target pressure setting range is the cathode pressure plus a pressure equivalent to an allowable membrane pressure difference of the electrolyte membranes used in the fuel cell stack 1. The "allowable membrane pressure difference" means that "a maximum pressure difference between the anode 1a and cathode 1b that the electrolyte membrane can tolerate without rupture". The atmospheric pressure used in the process is atmospheric pressure detected by a not-shown atmospheric pressure sensor or previously set atmospheric pressure (for example, standard atmospheric pressure, or 1 atm).

The main controller 32 then judges based on the signal from the anode pressure sensor 45 whether the anode pressure reaches the anode target pressure set in the step ST103 (step ST104). When the anode pressure is judged not to reach the anode target pressure (step ST104: No), this step is repeated until the anode pressure is judged to reach the anode target pressure. At the step S104, the hydrogen pressure regulator valve 13 is opened at a predetermined opening, and the purge valve 16 is closed. Accordingly, the anode is supplied with hydrogen gas and increases in pressure while the process of the step ST104 is repeated.

When the anode pressure is judged to reach the anode target pressure (step ST104: YES), the main controller 32 closes the air pressure regulator valve 22 and air inlet and outlet valves 23 and 24 to airtightly close the control section and thus prevent ingress of fresh air to the control section (step ST105).

Thereafter, the main controller 32 judges based on a signal from the voltage sensor 41 whether the stack, single cell, or cell group voltage is equal to or more than a predetermined voltage Va (step ST106). Herein, the predetermined voltage Va is a voltage value obtained when the concentration of oxygen at the cathode 1b is reduced to a predetermined concentration (a concentration when oxygen is sufficiently consumed) or less. Moreover, the concentration of oxygen at the cathode 1b is calculated from a referential oxygen concentration (for example, the oxygen concentration of air, or 21%) and an amount of oxygen consumed which is obtained from an amount of electric charges consumed by the current extraction device 31 and the volume and pressure of the oxygen consumption region of the cathode side.

When the stack, single cell, or cell group voltage is judged not to equal to or more than the predetermined voltage Va (step ST106: NO), this step is repeated until it is judged that the stack, single cell, or cell group voltage is not more than the predetermined voltage Va. On the other hand, when the stack, single cell, or cell group voltage is judged to equal to or less than the predetermined voltage Va (step S106: YES), the main controller 32 terminates the extraction of current from the fuel cell stack 1 by the current extraction device 31 (step ST107) and closes the hydrogen pressure regulator valve (step ST108). Thereafter, the main controller 32 stops the fuel circulating pump 14 (step ST110) and terminates the series of system shutdown control.

As described in detail above with a concrete example, according to the fuel cell system of the first embodiment, the current extraction device 31 is activated at the shutdown of the cell system for extraction of current. Accordingly, oxygen at the cathode 1b of the fuel cell stack 1 can be consumed. Furthermore, the air inlet and outlet valves 23 and 24 are closed after the extraction of current is started. Accordingly, the control section is airtightly closed while oxygen at the cathode 1b of the fuel cell stack 1 is consumed, so that ingress of fresh air can be prevented during the system shutdown process and the subsequent stop period. Accordingly, at the next start-up of the fuel cell system, the start-up operation is performed with the concentration of oxygen at the cathode 1b being low. It is therefore possible to effectively avoid the problem of degradation of the performance of the fuel cell stack 1 due to deterioration of a catalyst support and the like at the start-up of the fuel cell system.

Moreover, current extraction from the fuel cell stack 1 is performed by the current extraction device 31 with the anode pressure set to high pressure not less than atmospheric pressure and not less than the cathode pressure. Accordingly, the oxygen consumption at the cathode 1b can be performed through current higher than usual (for example, in the case where the anode pressure is set to atmospheric pressure) while deterioration due to insufficient fuel is suppressed, thus shortening the system shutdown time.

Moreover, the anode pressure is set to high pressure not less than atmospheric pressure and not less than the cathode pressure, and hydrogen moves from the anode 1a side to the cathode 1b side to increase the pressure of the cathode 1b. Accordingly, the pressure of the cathode 1b becomes equal to or more than atmospheric pressure, and the cathode 1b becomes less likely to suck fresh air. The ingress of fresh air can be further reduced.

Still furthermore, the difference between the upper limit of the anode pressure and the cathode pressure is set equal to or less than the allowable membrane pressure difference of the electrolyte membranes used in the fuel cell stack 1. It is therefore possible to increase the anode pressure while protecting the electrolyte membranes used in the fuel cell stack 1.

Still furthermore, the anode pressure is increased to pressure which is not less than atmospheric pressure and not less than the cathode pressure while the purge valve 16 of the hydrogen system 10 is closed and the circulation of hydrogen by the fuel circulation pump 14 and ejector 15 are continued. Accordingly, the anode pressure can be increased without excessively discharging hydrogen, making it possible to efficiently perform the system shutdown process.

In the system shutdown process shown in FIG. 2, it is judged based on the signal from the voltage sensor 41 whether the stack, single cell, or cell group voltage is equal to or less than the predetermined voltage Va in the step ST106. However, it may be judged based on the signal from the current sensor 42 whether the stack current is equal to or less than a predetermined value (equivalent to the stack voltage of Va). Alternatively, the system shutdown process may be configured as follows. Time Ta taken for the stack current of the fuel cell stack 1 to be reduced to equal to or less than Va after the current extraction is started is previously measured, and it is judged whether the time Ta elapses after the start of the current extraction in the step ST106.

Moreover, in the system shutdown process shown in FIG. 2, when the anode pressure is judged to reach the anode target pressure (step ST104: YES), the air pressure regulator valve 22 and air inlet and outlet valves 23 and 24 are closed (step ST105) before the stack voltage is judged to be equal to or less than the predetermined voltage. However, the air pressure regulator valve 22 and air inlet and outlet valves 23 and 24 should be closed at least after the anode pressure is increased to equal to or more than the anode target pressure. For example, the air pressure regulator valve 22 and air inlet and outlet valves 23 and 24 may be closed at the same time when the current extraction from the fuel cell stack 1 by the current extraction device 31 is terminated (ST106).

Second Embodiment

Next, a description is given of a fuel cell system according to a second embodiment of the present invention. The fuel cell system according to the second embodiment has a constitution similar to the fuel cell system according to the aforementioned first embodiment (see FIG. 1). However, according to the second embodiment, the control matters of the system shutdown process by the main controller 32 of the control unit 30 are partially different from that of the first embodiment. The characteristic part of the second embodiment is described below, and redundant description of the part same as that of the first embodiment is properly omitted.

Figure 4:
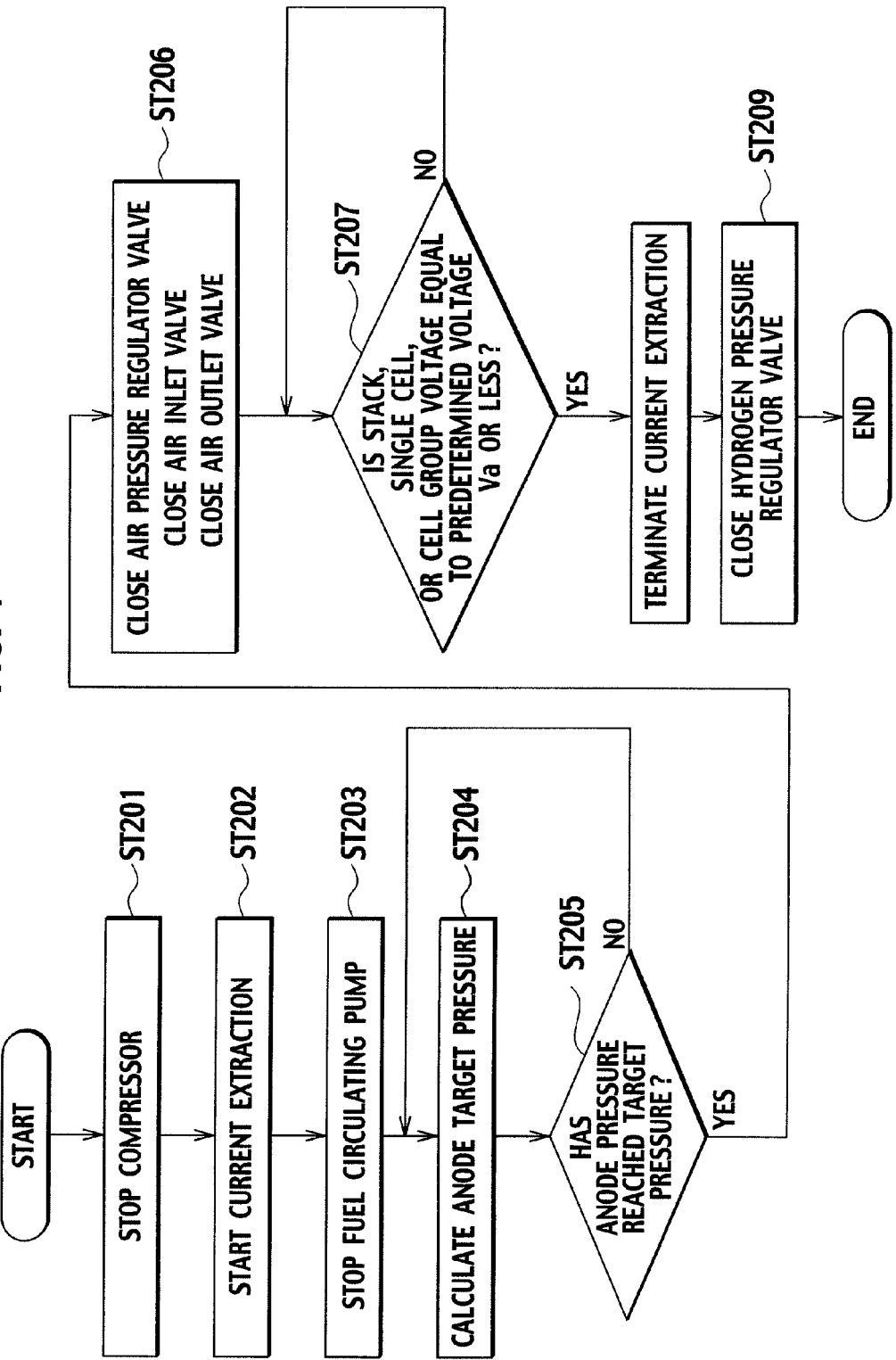
FIG. 4 is a flowchart showing a flow of a system shutdown process performed at shutting off the fuel cell system according to a second embodiment.

FIG. 4 is a flowchart showing a flow of the system shutdown process when the fuel cell system according to the second embodiment is stopped. At the start of the process shown in FIG. 4, it is assumed that the hydrogen pressure regulator valve 13 is opened at a predetermined opening, and the purge valve 16 is closed. Moreover, it is assumed that the fuel circulating pump 14 and compressor 21 are in operation; the air pressure regulator valve 22 is opened at a predetermined opening; and the air inlet and outlet valves 23 and 24 are opened. In FIG. 4, steps ST201 to ST202 and steps ST204 to ST209 are the same as the processing of the steps ST101 to ST102 and steps ST103 to ST108, respectively, and the description thereof is omitted.

In the fuel cell system according to the second embodiment, as shown in FIG. 4, immediately after starting current extraction from the fuel cell stack 1 by the current extraction device 31 (step ST202), the main controller 32 stops the fuel circulating pump 14 (step ST203). That intends the following matters: It takes a certain period of time for the fuel circulating pump 14 to completely stop. If the fuel circulating pump 14 is stopped after the current extraction from the fuel cell stack 1 is finished like the first embodiment, the system shutdown time is accordingly increased. Accordingly, the shutdown process of the fuel circulating pump 14 is performed in parallel to the current extraction from the fuel cell stack 1 to further shorten the system shutdown time.

The time taken for the fuel circulating pump 14 to completely stop (for the speed thereof to be reduced to substantially zero) is shorter than a current extraction period from the start to the end of the current extraction (the steps ST202 to ST208). When the fuel circulating pump 14 is stopped after the current extraction is started, the fuel circulating pump 14 is completely stopped (the speed thereof is reduced to substantially zero) at the end of the current extraction (step ST208). Accordingly, the system shutdown time can be shortened by a period of time taken for the speed of the fuel circulating pump 14 to be reduced to substantially zero.

Figure 5:
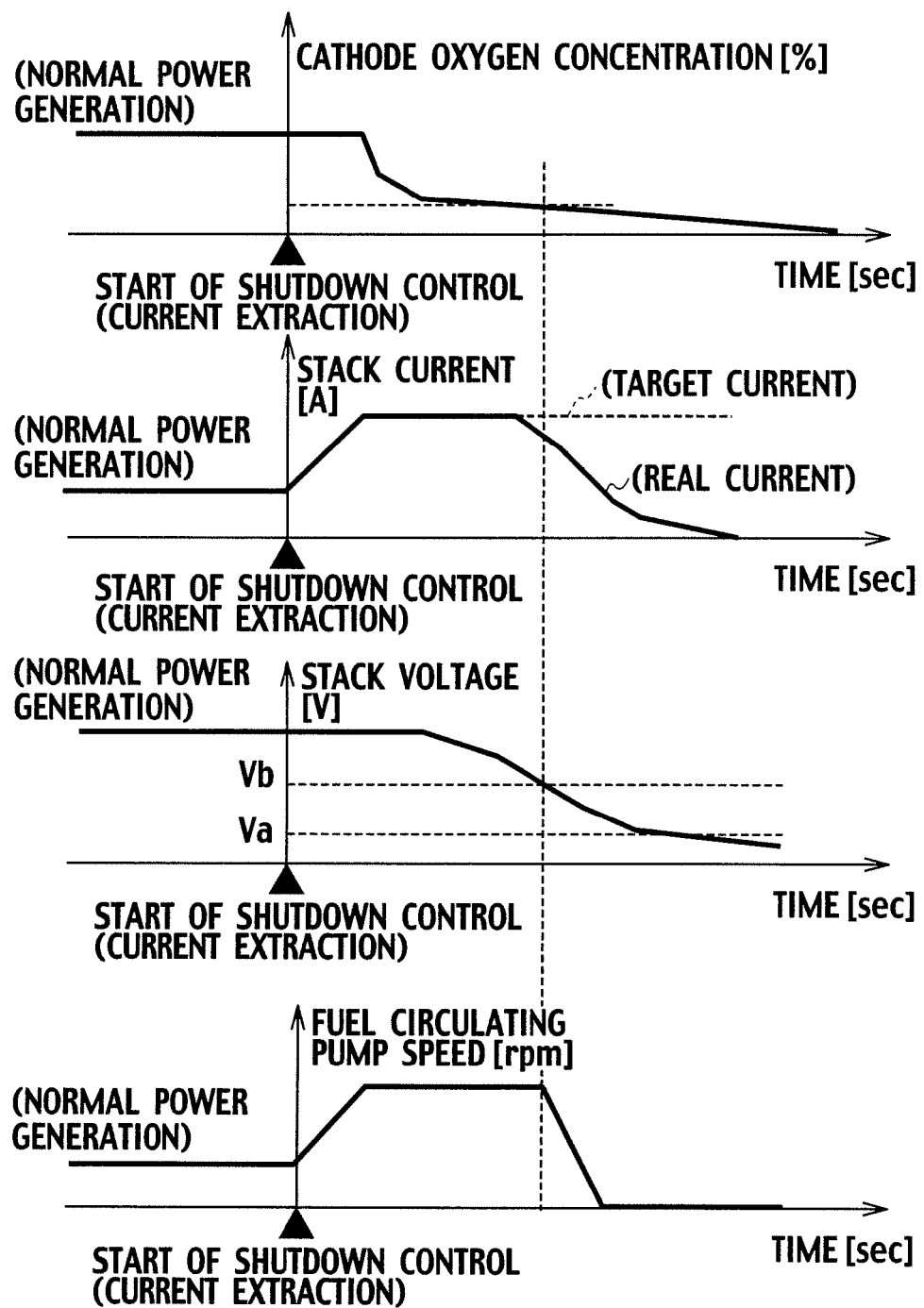
FIG. 5 is a diagram explaining the fuel cell system according to the second embodiment, showing time variations of a concentration of oxygen in a cathode, stack current, stack voltage, and speed of a fuel circulating pump during the system shutdown process.

In the system shutdown process shown in FIG. 4, the fuel circulating pump 14 is stopped immediately after the start of the current extraction but may be stopped at a predetermined time during the current extraction period (steps ST202 to ST208). As shown in FIG. 5, oxygen within the cathode 1b of the fuel cell stack 1 is consumed as the current extraction by the current extraction device 31 proceeds. The concentration of oxygen within the cathode 1b decreases over time, and the stack voltage and current decrease over time. Under the conditions of such reduced concentration of oxygen in the cathode 1b, the amount of hydrogen required for the electrochemical reaction with oxygen within the cathode 1b is reduced. Accordingly, it is effective that the fuel circulating pump 14 is stopped when the concentration of oxygen is reduced. In other words, the fuel circulating pump 14 is continued to operate while there is a plenty of oxygen in the cathode 1b and a lot of hydrogen is required for the electrochemical reaction immediately after the start of the current extraction from the fuel cell stack 1. The fuel circulating pump 14 is then stopped at a predetermined time after electric charges are consumed by the current extraction from the fuel cell stack 1 to reduce the concentration of oxygen in the cathode 1 to a certain level and the amount of hydrogen required for the electrochemical reaction is reduced. Herein, the predetermined time should be determined by detecting the progress of the reaction with a certain method. For example, the predetermined time can be determined as time when the stack, single cell, or cell group voltage becomes lower than a predetermined voltage Vb (>Va).

As described above, according to the fuel cell system of the second embodiment, similar to the first embodiment, it is possible to avoid the problem of the reduction of the performance of the fuel cell stack 1 due to degradation occurring in the catalyst support and the like at the start-up of the fuel cell system and shorten the system shutdown time. Moreover, in the fuel cell system according to the second embodiment, the fuel circulating pump 14 is stopped in the current extraction period between the start and end of the current extraction from the fuel cell stack 1. Accordingly, the system shutdown time can be shortened by the time taken for the speed of the fuel circulating pump 14 to be reduced to substantially zero. Furthermore, it is possible to reduce operating noise caused by operations of the fuel circulating pump 14, thus improving the silence. Moreover, it is possible to reduce the power consumption by the fuel circulating pump 14 and perform the system shutdown process more efficiently.

Third Embodiment

Next, a description is given of a fuel cell system according to a third embodiment of the present invention. The fuel cell system according to the third embodiment has a similar constitution to the fuel cell system according to the aforementioned first embodiment (see FIG. 1) but differs from the first embodiment in a part of the control matters of the system shutdown process by the main controller 32 of the control unit 30, specifically, a process of setting the anode target pressure. The characteristic matters of the third embodiment are described below, and redundant description of the part same as that of the first embodiment is properly omitted.

Figure 6:
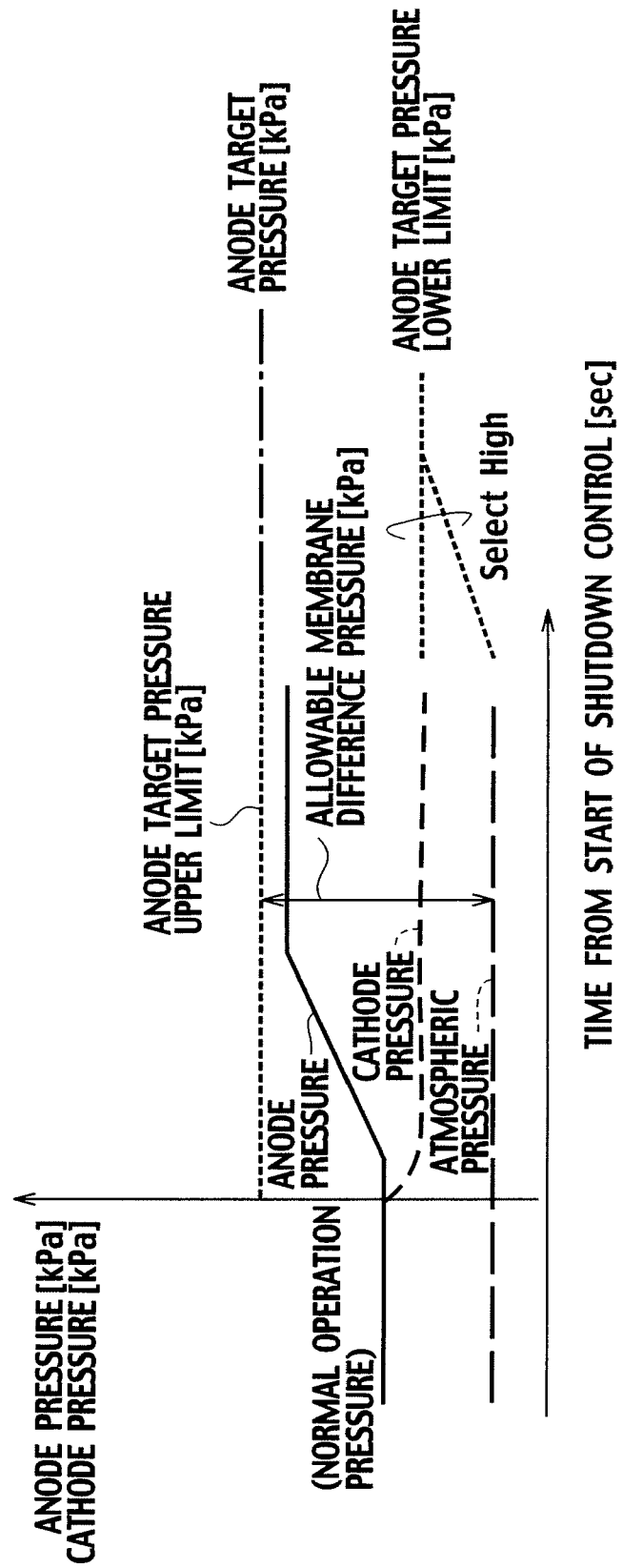
FIG. 6 is a diagram explaining a method by which a main controller of a control unit sets an anode target pressure in a fuel cell system according to a third embodiment.

FIG. 6 is a diagram explaining a method by which the main controller 32 of the control unit 30 sets the anode target pressure. The main controller 32 sets the anode target pressure to an arbitrary value within the anode target pressure setting range as shown in FIG. 6. Herein, the lower limit of the anode target pressure setting range is the highest of atmospheric pressure and the cathode pressure similar to the first embodiment. On the other hand, the upper limit of the anode target pressure setting range is the atmospheric pressure plus pressure equal to the allowable membrane pressure difference of the electrolyte membranes used in the fuel cell stack 1. The atmospheric pressure used in the process is atmospheric pressure detected by a not-shown atmospheric pressure sensor or previously set atmospheric pressure (for example, standard atmospheric pressure or 1 atm). Even when the cathode pressure is reduced from the pressure at the shutdown of the fuel cell system to atmospheric pressure during the leaving period after the shutdown of the fuel cell system (a period from the end of the system shutdown process to the next start-up of the fuel cell system), the anode pressure does not exceed the allowable membrane pressure difference of the electrolyte membranes used in the fuel cell system 1, and the electrolyte membrane can be reliably protected.

As described above, according to the fuel cell system of the third embodiment, similar to the first embodiment, it is possible to avoid the problem of the reduction of the performance of the fuel cell stack 1 due to degradation caused in the catalyst support and the like at the start-up of the fuel cell system and shorten the system shutdown time. Moreover, especially in the fuel cell system according to the third embodiment, the anode target pressure during the system shutdown process is set equal to or less than atmospheric pressure plus the pressure equal to the allowable membrane pressure difference of the electrolyte membranes used in the fuel cell stack 1. Accordingly, even when the cathode pressure is reduced to atmospheric pressure during the stop period of the fuel cell system, the electrolyte membranes used in the fuel cell stack 1 can be reliably protected.

Fourth Embodiment

Next, a description is given of a fuel cell system according to a fourth embodiment of the present invention. The fuel cell system according to the fourth embodiment has a similar constitution to the fuel cell system according to the aforementioned first embodiment (see FIG. 1) but differs from the first embodiment in the control of the system shutdown process by the main controller 32 of the control unit. The characteristic matters of the fourth embodiment are described below, and redundant description of the part same as that of the first embodiment is properly omitted.

Figure 7:
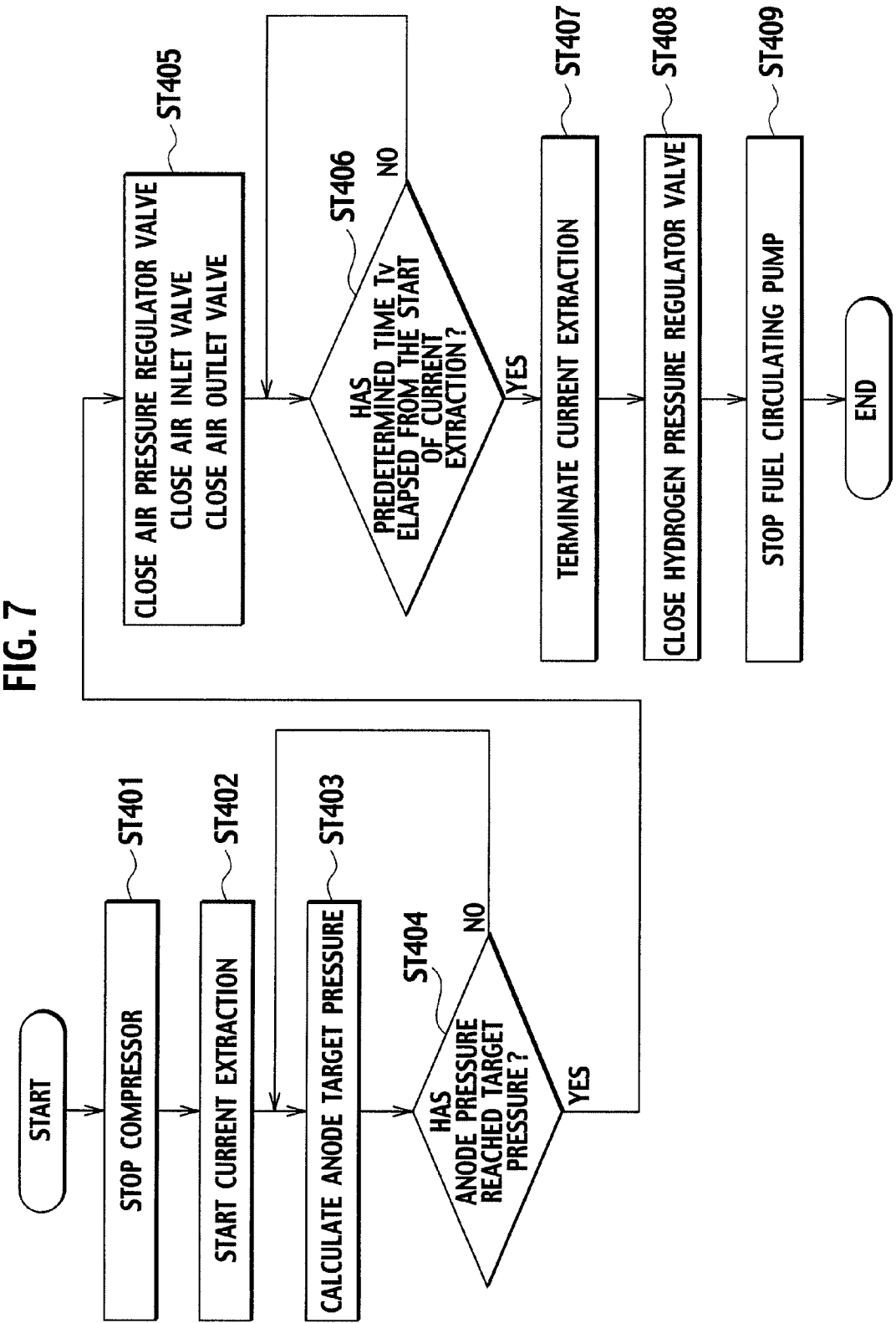
FIG. 7 is a flowchart showing a flow of a system shutdown process performed at shutting down the fuel cell system according to a fourth embodiment.

FIG. 7 is a flowchart showing a flow of the system shutdown process when the fuel cell system according to the fourth embodiment is stopped. At the start of the process shown in FIG. 7, it is assumed that the hydrogen pressure regulator valve 13 is opened at a predetermined opening and that the purge valve 16 is closed. Moreover, it is assumed that the fuel circulating pump 14 and compressor 21 are in operation; the air pressure regulator valve 22 is opened at a predetermined opening; and the air inlet and outlet valves 23 and 24 are opened. In FIG. 7, steps ST401 to ST402, steps ST404 to ST405, and steps ST407 to ST409 are the same as the steps ST101 and ST102, steps ST104 to ST105 and steps ST107 to ST109 of FIG. 2, respectively, and the description thereof is omitted.

In the fuel cell system according to the fourth embodiment, as shown in FIG. 7, the main controller 32 of the control unit 30 causes the current extraction device 31 to start the current extraction from the fuel cell stack 1 (step ST402) and then calculates the anode target pressure based on the signal from the anode pressure sensor 34 (step ST403).

With reference to FIG. 8, a description is given of a method of calculating the anode target pressure in step ST403. When the current extraction device 31 starts the current extraction from the fuel cell stack 1, by the reduction of the concentration of oxygen at the cathode 1b due to electric charge consumption, the voltage of the fuel cell stack 1 is gradually reduced (see FIG. 8(c)), and current allowed to be extracted from the fuel cell stack 1 is reduced (see FIG. 8(b)). When the current extraction from the fuel cell stack 1 is carried out for long time enough (Ta [sec]), oxygen in the cathode 1b is completely consumed (a dashed dotted line in FIG. 8(a)), and the voltage and current of the fuel cell stack 1 is reduced to substantially zero. On the other hand, if the current extraction from the fuel cell stack 1 is carried out for time Tv [sec] which is shorter than time Ta [sec] taken to completely consume oxygen in the cathode 1b, a certain amount of oxygen remains within the cathode 1b (concentration Dc[%]). The oxygen remaining in the cathode 1b reacts with hydrogen transmitted from the anode 1a based on the following chemical reaction formula during the system stop period from the end of the system shutdown process to the start-up of the fuel cell system:

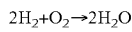

$$2H_2+O_2 \rightarrow 2H_2O$$

Figure 9:
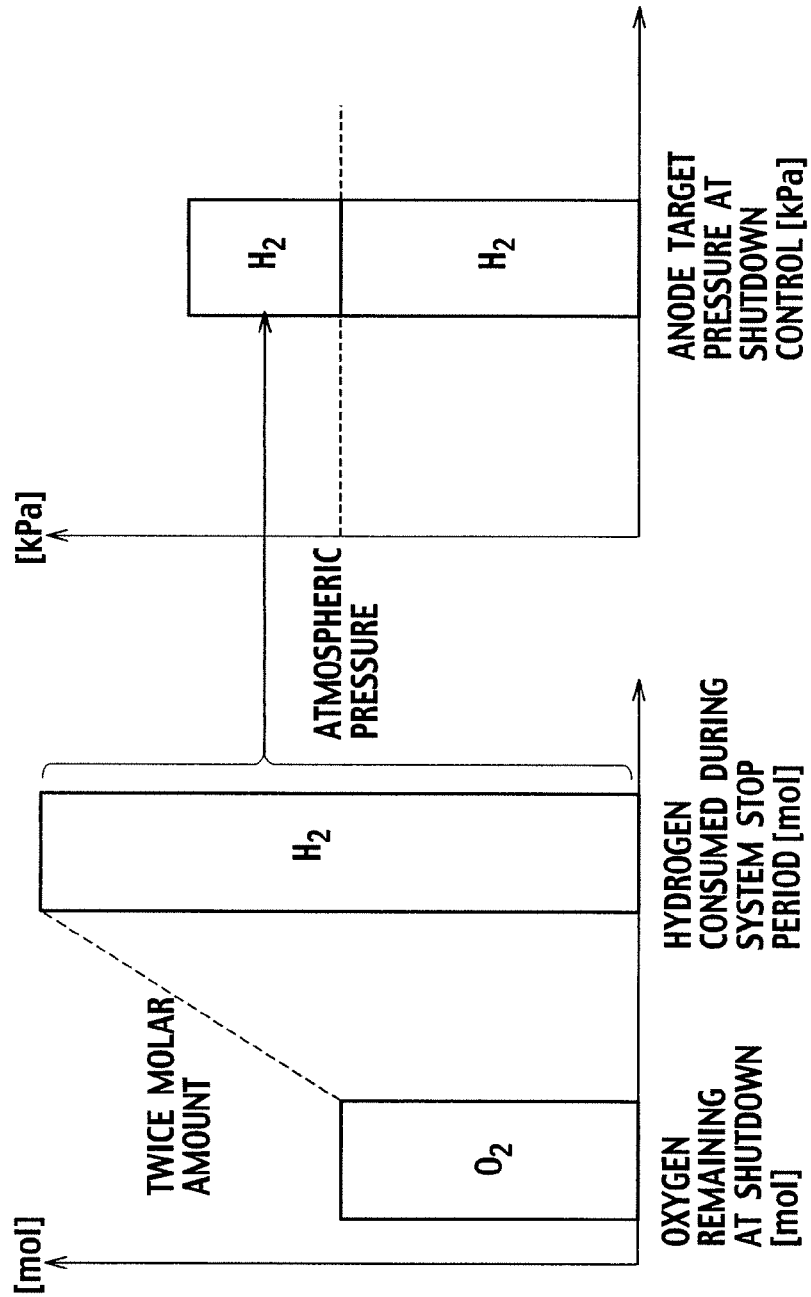
FIG. 9 is a diagram explaining a method by which a main controller of a control unit sets an anode target pressure in the fuel cell system according to the fourth embodiment.

The above formula reveals that, in order that oxygen remaining in the cathode 1b with hydrogen transmitted from the anode 1a reacts with hydrogen, two hydrogen molecules are consumed for one oxygen molecule. In other words, during the system stop period, hydrogen is consumed twice oxygen with the concentration Dc [%] described above. The amount of oxygen remaining in the cathode 1b is determined depending on length of time taken for the current extraction device 31 to extract current from the fuel cell stack 1 (length of the current extraction period). The longer the current extraction period is, the less the amount of oxygen remaining in the cathode 1b at the shutdown of the fuel cell system. As described above, in the fuel cell system according to the fourth embodiment, the anode target pressure is set to not less than atmospheric pressure plus pressure corresponding to the amount of hydrogen which is twice the amount of oxygen estimated to remain in the cathode 1b of the fuel cell stack 1 at the end of the current extraction period as shown in FIG. 9 in the step ST403 of FIG. 7. Even if hydrogen is transmitted to the anode 1a during the system stop period and consumes oxygen within the cathode 1b, the pressure of anode 1a is not reduced to the atmospheric pressure or less. It is therefore possible to prevent ingress of fresh air during the system stop period.

The amount of oxygen remaining in the cathode 1b of the fuel cell stack 1 at the end of the current extraction period is uniquely determined based on the length of the current extraction period, the current amount extracted from the fuel cell stack 1 during the current extraction period, volume of the oxygen consumption region of the cathode 1b, and the like. Herein, since the volume of the oxygen consumption region of the cathode 1b does not change, the amount of oxygen remaining in the cathode 1b of the fuel cell stack 1 at the end of the current extraction period can be estimated from the length of the current extraction period when the current amount extracted from the fuel cell stack 1 during the current extraction period is not changed. In this embodiment, the amount of oxygen remaining in the cathode 1b of the fuel cell stack 1 is estimated from the predetermined time Tv after the start of the current extraction where the amount of current extracted from the fuel cell stack 1 during the current extraction period is constant, and the length of the current extraction period is previously set to a predetermined time Tv.

Herein, a description is given of a process of step ST406 of FIG. 7. In the fuel cell system according to the fourth embodiment, the main controller 32 counts time elapsing after the current extraction starts (step ST402) and judges whether the predetermined time Tv has elapsed after the start of the current extraction (step ST406). When the time elapsed after the start of the current extraction does not reach the predetermined time Tv (step ST406: NO), this process is repeated to continue charge consumption by the current extraction device 30 until the predetermined time Tv elapses. On the other hand, when it is judged that the predetermined time has elapsed after the start of the current extraction (step ST406): YES), the current extraction from the fuel cell stack 1 by the current extraction device 30 is terminated (step ST407).

As described above, according to the fuel cell system of the fourth embodiment, similar to the first embodiment, it is possible to avoid the problem of the reduction of the performance of the fuel cell stack 1 due to degradation caused in the catalyst support and the like at the system start-up and shorten the system shutdown time. Moreover, especially in the fuel cell system according to the fourth embodiment, the anode target pressure during the system shutdown process is set equal to or more than the atmospheric pressure plus the pressure corresponding to the amount of hydrogen twice the amount of oxygen estimated to remain in the cathode 1b of the fuel cell stack 1 at the end of the current extraction period. Accordingly, even if hydrogen necessary for consuming oxygen within the cathode 1b during the system stop period is transmitted from the anode 1a to the cathode 1b, the ingress of fresh air during the system stop period can be prevented.

Fifth Embodiment

Next, a description is given of a fuel cell system according to a fifth embodiment of the present invention. The fuel cell system according to the fifth embodiment has a similar constitution to the aforementioned fuel cell system according to the first embodiment (see FIG. 1). Moreover, the fuel cell system according to the fifth embodiment is basically the same as the aforementioned embodiment in control of the system shutdown process by the main controller 32 of the control unit 30 (see FIG. 7) but partially differs from the fourth embodiment in the method of calculating the anode target pressure (the step ST403 of FIG. 7). The characteristic matters of the fifth embodiment are described below, and redundant description of the part same as those of the first and fourth embodiments are properly omitted.

FIG. 10 is a diagram showing changes in concentration of oxygen within the cathode 1b by the current extraction from the fuel cell stack 1 and changes in stack current and voltage.

At the current extraction from the fuel cell stack 1, the following reactions occur in the anode 1a and cathode 1b of the fuel cell stack 1 to consume oxygen in the cathode 1b.

Anode 1a: $H_2 \rightarrow 2H^+ + 2e^-$

Cathode 1b: $4H^+ + O_2 + 4e^- \rightarrow 2H_2O$

As apparent from these reaction formulae, the amount of oxygen consumed at the cathode 1b by current extraction from the fuel cell stack 1 changes as the amount of current extracted from the fuel cell stack 1 changes. Comparing cases where the value of the current extracted by the current extraction device 31 is $I_H$ (see a solid line of FIG. 10(b)) and where the value of the current extracted by the current extraction device 31 is $I_L$ (see a dashed-dotted line of FIG. 10(b)) (herein, $I_H > I_L$), the amount of oxygen remaining in the cathode 1b in the case of the current $I_H$ is lower than that in the case of the current $I_L$ ($D_H < D_L$) after current extraction is carried out for a predetermined time Tv [sec] since the amounts of reaction per unit time of the above reactions at the anode and cathode 1a and 1b are different. In other words, the amount of oxygen consumed at the cathode 1b is determined depending on magnitude of extracted current when the current extraction period of the current extraction device 30 is constant (Tv [sec]).

In the fuel cell system according to the fifth embodiment, similar to the aforementioned fourth embodiment, the anode target pressure is set to equal to or more than atmospheric pressure plus pressure corresponding to the amount of hydrogen twice the amount of oxygen estimated to remain in the cathode 1b of the fuel cell stack 1 at the end of the current extraction period. As described above, the amount of oxygen remaining in the cathode 1b of the fuel cell stack 1 at the end of the current extraction period is uniquely determined depending on the length of the current extraction period, the value of current extracted from the fuel cell stack 1 during the period, volume of the oxygen consumption region of the cathode 1b, and the like, and the volume of the oxygen consumption region of the cathode 1b does not change. Accordingly, when the length of the current extraction period is constant, the amount of oxygen remaining in the cathode 1b of the fuel cell stack 1 at the end of the current extraction period can be estimated from the amount of extracted current. In this embodiment, the amount of oxygen remaining in the cathode 1b of the fuel cell stack 1 at the end of the current extraction period is estimated from the target value of extracted current with the length of the current extraction period being set constant (T [sec]).

As described above, according to the fuel cell system of the fifth embodiment, similar to the first embodiment, it is possible to avoid the problem of the reduction of the performance of the fuel cell stack 1 due to degradation caused in the catalyst support and the like at the start-up of the fuel cell system and shorten the system shutdown time. Moreover, especially in the fuel cell system according to the fifth embodiment, the anode target pressure during the system shutdown process is set equal to or more than atmospheric pressure plus the pressure corresponding to the amount of hydrogen twice the amount of oxygen estimated to remain in the cathode 1b of the fuel cell stack 1 at the end of the current extraction period. Accordingly, similar to the fourth embodiment, even if hydrogen necessary for consuming oxygen within the cathode 1b during the system stop period is transmitted from the anode 1a to the cathode 1b, the pressure of the anode 1a is not reduced to the atmospheric pressure or less, thus preventing the ingress of fresh air during the system stop period.

Sixth Embodiment

Next, a description is given of a fuel cell system according to a sixth embodiment. The fuel cell system according to the sixth embodiment has a similar constitution to the fuel cell system according to the aforementioned first embodiment (see FIG. 1) but differs from the first embodiment in part of the control matters of the system shutdown process by the main controller 32 of the control unit 30. The characteristic matters of the fourth embodiment are described below, and redundant description of the part same as that of the first embodiment is properly omitted.

Figure 11:
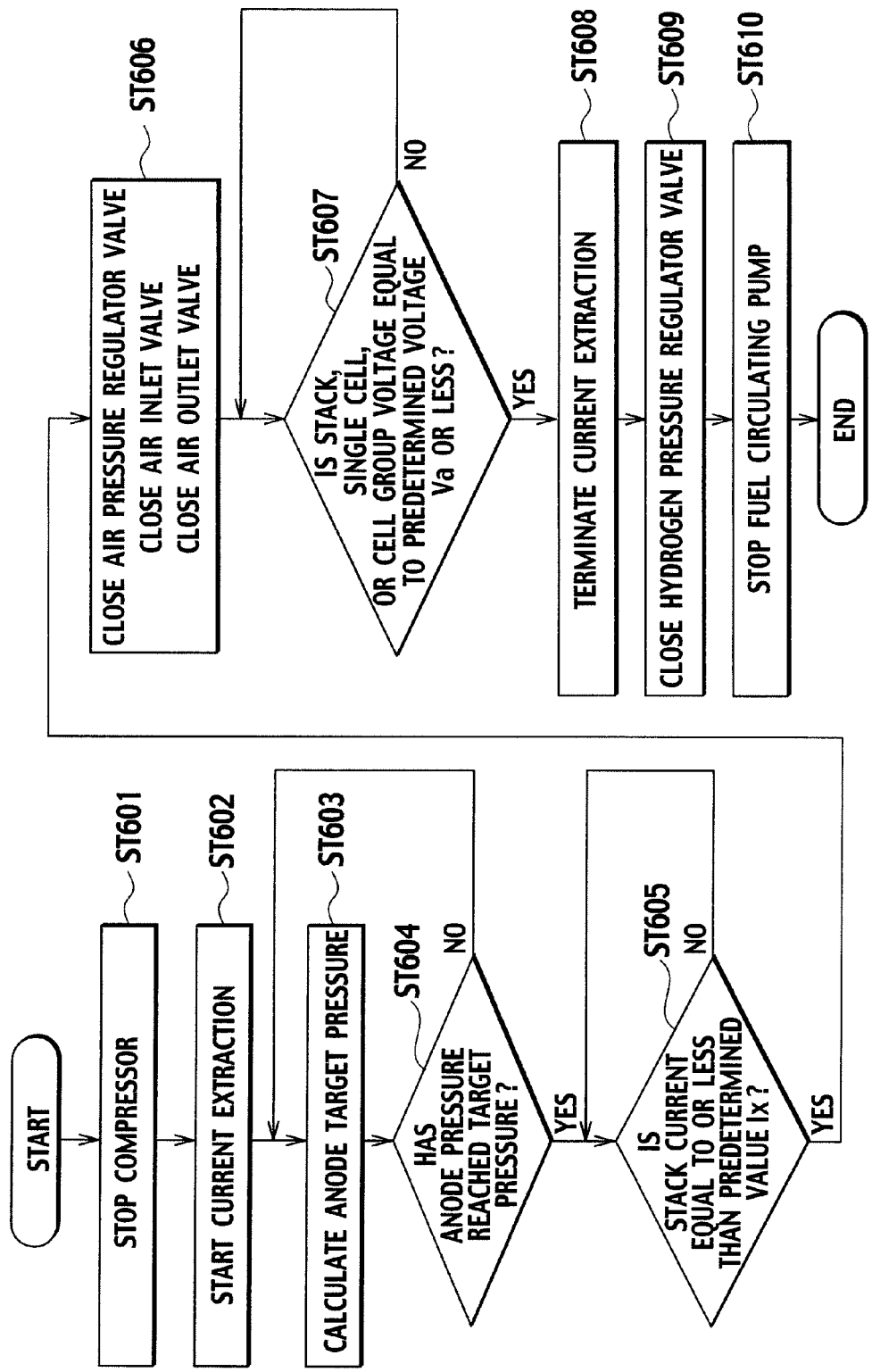
FIG. 11 is a flowchart showing a flow of a system shutdown process performed at shutting off a fuel cell system according to a sixth embodiment.

FIG. 11 is a flowchart showing a flow of the system shutdown process at the shutdown of the fuel cell system according to the sixth embodiment. At the start of the process shown in FIG. 11, it is assumed that the hydrogen pressure regulator valve 13 is opened at a predetermined opening and the purge valve 16 is closed. Moreover, it is assumed that the fuel circulating pump 14 and compressor 21 are in operation; the air pressure regulator valve 22 is opened at a predetermined opening; and the air inlet and outlet valves 23 and 24 are opened. In FIG. 11, steps ST601 to ST604 and steps ST606 to ST610 are the same as the steps ST101 to ST104 and steps ST105 to ST109, respectively, and the description thereof is omitted.

In the fuel cell system according to the sixth embodiment, as shown in FIG. 11, when the main controller 32 judges that the anode pressure reaches the anode target pressure (step ST604: YES), the main controller 32 judges based on the signal from the current sensor 42 whether the current extracted from the fuel cell stack 1 is equal to or less than a predetermined value $I_x$ (step ST605). When the main controller 32 judges that the current extracted from the fuel cell stack 1 is equal to or less than the predetermined value $I_x$, the main controller 32 closes the air pressure regulator valve 22 and air inlet and outlet valves 23 and 24 to airtightly close the control section, thus preventing ingress of fresh air into the control section (step ST606).

Herein, the predetermined value $I_x$ is a current value as a judgment threshold and is less than the target value of the current which the current extraction device 31 extracts from the fuel cell stack 1 (target extraction current). This is described below using FIG. 12. When current is extracted from the fuel cell stack 1 by the current extraction device 31, the concentration of oxygen in the cathode 1b is reduced. Accordingly, current is extracted from the fuel cell stack 1 according to the target extraction current while there is a plenty of oxygen in the cathode 1b. On the other hand, as the electric charge consumption progresses and the amount of oxygen in the cathode 1b is reduced, current extracted from the fuel cell stack 1 is reduced. In the state where the amount of extracted current is large (where current equal to the target extraction current is extracted just after the start of current extraction), there is a large amount of oxygen in the cathode 1b (see part A of FIG. 12), and pressure of the cathode 1b is largely reduced. When the amount of the extracted current is reduced, the decrease in pressure of the cathode 1 is reduced (see part B of FIG. 12). If the air inlet and outlet valves 23 and 24 are closed while the decrease in pressure of the cathode 1 is large, the difference in pressure between the anode and cathode can be equal to or more than the allowable membrane pressure difference of the electrolyte used in the fuel cell stack 1 in the system shutdown process. Moreover, when the cathode pressure is reduced to atmospheric pressure or less, the amount of air sucked from the outside can increase at the stopping the system. In this embodiment, therefore, it is judged based on the signal from the current sensor 42 that the current extracted from the fuel cell stack 1 does not reach the target extraction current. The air inlet and outlet valves 23 and 24 are closed after the current extracted from the fuel cell stack 1 began not to reach the target extraction current or after the rate of oxygen consumption of the cathode 1b is reduced. The predetermined value $I_x$ as the threshold of judgment should be just a value allowing reliable detection that the value of current is reduced with respect to the target extraction current considering sensor errors and response of the current sensor 35 and control margin.

As described above, according to the fuel cell system of the sixth embodiment, similar to the first embodiment, it is possible to avoid the problem of the reduction of the performance of the fuel cell stack 1 due to degradation caused in the catalyst support and the like at the start up of the fuel cell system and shorten the system shutdown time. Moreover, especially in the fuel cell system according to the sixth embodiment, the air inlet and outlet valves 23 and 24 are closed after the rate of oxygen consumption of the cathode 1b is sufficiently reduced. It is therefore possible to efficiently perform the system shutdown process in a short time and reliably protect the electrolyte membranes used in the fuel cell stack 1 even during the system stop period.

In this embodiment, the judgment for closing the air inlet and outlet valves 23 and 24 is performed based on the value of current extracted from the fuel cell stack 1. In addition, the air inlet and outlet valves 23 and 24 may be closed based on a judgment whether the stack, single cell, or cell group voltage is equal to or less than a predetermined voltage $V_x$ (corresponding to the current $I_x$ extracted from the fuel cell stack 1), a judgment based on a rate of decrease in stack, single cell, or cell group voltage, or time from the start of the current extraction which is previously measured in experiment.

Seventh Embodiment

Next, a description is given of a fuel cell system according to a seventh embodiment of the present invention. The fuel cell system according to the seventh embodiment has a similar constitution to the fuel cell system according to the aforementioned first embodiment (see FIG. 1) but differs from the first embodiment in part of the control matters of the system shutdown process by the main controller 32 of the control unit 30. The characteristic matters of the seventh embodiment are described below, and redundant description of the part same as that of the first embodiment is properly omitted.

Figure 13:
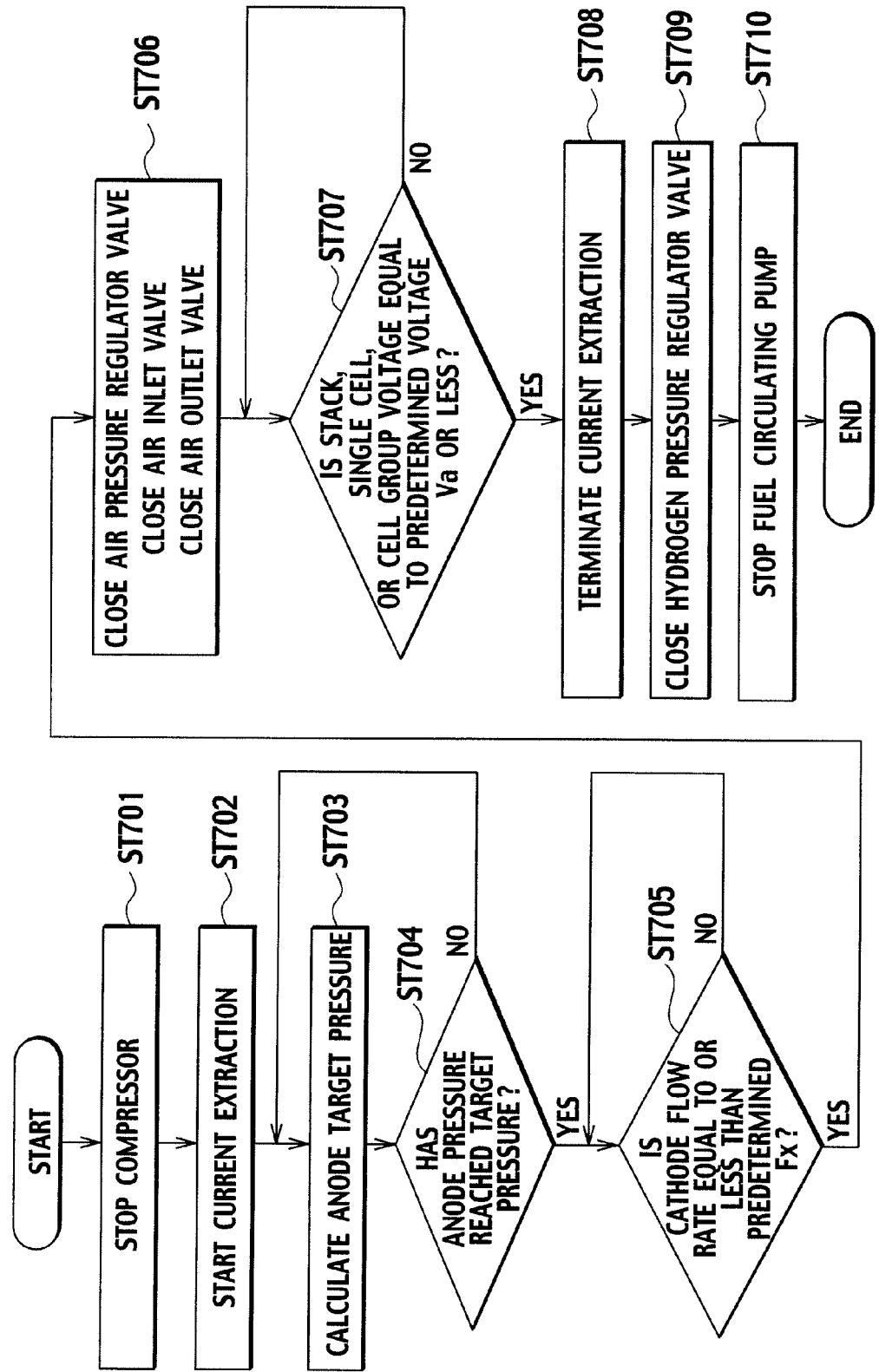
FIG. 13 is a flowchart showing a flow of a system shutdown process performed at shutting off a fuel cell system according to a seventh embodiment.

FIG. 13 is a flowchart showing a flow of the system shutdown process at the shutdown of the fuel cell system according to the seventh embodiment. At the start of the process shown in FIG. 13, it is assumed that the hydrogen pressure regulator valve 13 is opened at a predetermined opening and the purge valve 16 is closed. Moreover, it is assumed that the fuel circulating pump 14 and compressor 21 are in operation; the air pressure regulator valve 22 is opened at a predetermined opening; and the air inlet and outlet valves 23 and 24 are opened. In FIG. 13, steps ST701 to ST704 and steps ST706 to ST710 are the same as the steps ST101 to ST104 and steps ST105 to ST109, respectively, and the description thereof is omitted.

In the fuel cell system according to the seventh embodiment, as shown in FIG. 13, when the main controller 32 judges that the anode pressure reaches the anode target pressure (step ST704: YES), the main controller 32 judges based on the signal from the cathode flow rate sensor 44 whether the flow rate of air supplied to the cathode 1b of the fuel cell stack 1 is equal to or less than a predetermined value $F_x$ (step ST705). After the main controller 32 judges that the flow rate of air supplied to the cathode 1b of the fuel cell stack 1 is equal to or less than the predetermined value $F_x$, the main controller 32 closes the air pressure regulator valve 22 and the air inlet and outlet valves 23 and 24 to airtightly close the control section, thus preventing ingress of fresh air into the control section (step ST706).

Herein, the predetermined value Fx is a threshold of judgment whether the supply of air to the cathode 1b of the fuel cell stack 1 is completely shut off. The predetermined value Fx is set to a value that allows detection of reduction of the flow rate of air supplied to the cathode 1b to substantially zero considering sensor error and response of the cathode flow rate sensor 44 and control margin.

When the normal operation state goes into the system shutdown process, the main controller 32 stops the compressor 21 (step ST701). However, the compressor 21 continues operating through inertia for a while, and it takes long until the compressor 21 completely stops and the flow rate of air supplied to the cathode 1b of the fuel cell stack 1 becomes substantially zero. When the air inlet and outlet valves 23 and 24 are closed while air is flown to the cathode 1b of the fuel cell stack 1, the air supplied from the compressor 21 is accumulated in a path section to the air inlet valve 23 to increase pressure of the path section. On the other hand, in the control section between the air inlet and outlet valves 23 and 24, oxygen in the cathode 1b of the fuel cell stack 1 is consumed to reduce the pressure. This causes a difference in pressure between the upstream side (compressor 21 side) and the downstream side (cathode 1b side of the fuel cell stack 1) of the air inlet valve 23, thus affecting the endurance of the air inlet valve 23. Moreover, the leakage flow rate of the air inlet valve 23 is affected by pressure at the upstream and downstream of the valve 23, and the difference in pressure could increase the flow rate of air flowing into the cathode 1b of the fuel cell stack 1 while the fuel cell system is stopped. Moreover, if the air inlet valve 23 is closed while air is flown into the cathode 1b, the air is returned to the compressor 21 and places burden on the compressor 21, thus affecting the endurance of the compressor 21. In this embodiment, it is judged that the speed of the compressor 21 becomes substantially zero and the flow rate of air supplied to the cathode 1b of the fuel cell stack 1 becomes substantially zero when the detection value of the cathode flow rate sensor 44 is equal to or less than the predetermined value Fx (step ST705: YES), and the air inlet and outlet valves 23 and 24 are closed.

As described above, according to the fuel cell system of the seventh embodiment, similar to the first embodiment, it is possible to avoid the problem of the reduction in the performance of the fuel cell stack 1 due to degradation caused in the catalyst support and the like at the start-up of the fuel cell system and shorten the system shutdown time. Moreover, especially in the fuel cell system according to the seventh embodiment, the air inlet and outlet valves 23 and 24 are closed after the flow rate of air supplied to the cathode 1b of the fuel cell stack 1 becomes substantially zero. It is therefore possible to efficiently perform the system shutdown process in a short time and prevent pressure difference between the downstream and upstream of the air inlet and outlet valves 23 and 24, thus protecting the compressor 21 and air inlet and outlet valves 23 and 24.

In this embodiment, the cathode flow rate detector is the cathode flow rate sensor 44 provided for the air supply path L20. Instead of using the cathode flow rate sensor 44, the fuel cell system may be configured as follows: the speed of the compressor 21 is read, and the flow rate of air supplied to the cathode 1b of the fuel cell stack 1 is judged to be substantially zero when the speed of the compressor 21 becomes substantially zero. It is also possible to constitute the same system by previously measuring the time for the speed of the compressor 21 to become substantially zero by experiment and using time elapsed after the compressor 21 is stopped (step ST701) as the cathode flow rate detector.

Hereinabove, the first to seventh embodiments are exemplified as the concrete embodiments of the present invention, but the technical range of the present invention is not limited by the contents disclosed in the description of the aforementioned embodiments and includes various alternative techniques which can be easily achieved by the above description.

The entire content of a Japanese Patent Application No. P2007-199088 with a filing date of Jul. 31, 2007 is herein incorporated by reference.

Although the invention has been described above by reference to certain embodiments of the invention, the invention is not limited to the embodiments described above and modifications may become apparent to these skilled in the art, in light of the teachings herein. The scope of the invention is defined with reference to the following claims.

What is claimed is:

1. A shutdown method of a fuel cell system,
the fuel cell system comprising:
    a fuel cell comprising:
        a fuel electrode;
        an oxidant electrode; and
        an electrolyte membrane, the fuel electrode and the oxidant electrode being opposed to each other with the electrolyte membrane interposed therebetween;
    a fuel supply system which supplies a fuel gas to the fuel electrode, the fuel gas containing hydrogen;
    an oxidant supply system which supplies an oxidant gas to the oxidant electrode, the oxidant gas containing oxygen;
    a pair of fresh-air control valves which are individually provided for inlet and outlet sides of the fuel cell in the oxidant supply system and prevent ingress of the oxidant gas into the oxidant electrode; and
    a current extraction device which extracts current from the fuel cell during a system shutdown process,
the method comprising:
    continuing the supply of the fuel gas to the fuel electrode through the fuel supply system, and stopping the supply of the oxidant gas to the oxidant electrode through the oxidant supply system;
    after stopping the supply of the oxidant gas, extracting current from the fuel cell;
    after extracting current, increasing pressure of the fuel gas in the fuel electrode to not less than atmospheric pressure and not less than pressure of the oxidant gas in the oxidant electrode; and
    after increasing the pressure of the fuel gas. airtightly closing the fresh air control valves to prevent the ingress of the oxidant gas into the oxidant electrode.

2. The shutdown method of the fuel cell system according to claim 1,
    wherein the fuel supply system further comprises: a fuel circulation device which circulates the fuel gas discharged from the fuel electrode through a circulating pump, and supplies the fuel gas again to the fuel electrode, and
    the fuel circulation device continues the circulation of the fuel gas while increasing the pressure of the fuel gas in the fuel electrode to not less than the atmospheric pressure and not less than the pressure of the oxidant gas in the oxidant electrode.

3. The shutdown method of the fuel cell system according to claim 1,
    wherein the fuel supply system further comprises: a fuel circulation device which circulates the fuel gas discharged from the fuel electrode through an ejector, and supplies the fuel gas again to the fuel electrode, and the fuel circulation device continues the circulation of the fuel gas while increasing the pressure of the fuel gas in the fuel electrode to not less than the atmospheric pressure and not less than the pressure of the oxidant gas in the oxidant electrode.

4. The shutdown method of the fuel cell system according to claim 1, wherein the fuel supply system further comprises: a fuel circulation device which circulates the fuel gas discharged from the fuel electrode through a circulating pump and an ejector, and supplies the fuel gas again to the fuel electrode, and the fuel circulation device continues the circulation of the fuel gas while increasing the pressure of the fuel gas in the fuel electrode to not less than the atmospheric pressure and not less than the pressure of the oxidant gas in the oxidant electrode, and operation of the circulating pump is stopped before terminating the extraction of current from the fuel cell through the current extraction device.

5. The shutdown method of the fuel cell system according to claim 1, wherein the fuel cell system further comprises a system-shutdown controller which integrally controls the system shutdown process, and the system-shutdown controller sets a target pressure of the fuel gas between the atmospheric pressure and equal to or less than a value obtained by adding the atmospheric pressure to pressure equal to allowable membrane difference pressure of the electrolyte membrane.

6. The shutdown method of the fuel cell system according to claim 1, wherein the fuel cell system further comprises a system-shutdown controller which integrally controls the system shutdown process, and the system-shutdown controller sets a target pressure of the fuel gas to equal to or less than a value obtained by adding the atmospheric pressure to pressure corresponding to an amount of hydrogen twice an amount of oxygen estimated to remain in the oxidant electrode at an end of the current extraction from the fuel cell by the current extraction device.

7. The shutdown method of the fuel cell system according to claim 6, wherein the system-shutdown controller estimates the amount of oxygen remaining in the oxidant electrode at the end of the current extraction based on a setting value of a period of time to extract current from the fuel cell by the current extraction device.

8. The shutdown method of the fuel cell system according to claim 6, wherein the system-shutdown controller estimates the amount of oxygen remaining in the oxidant electrode at the end of the current extraction based on a target value of an amount of current extracted from the fuel cell by the current extraction device.

9. The shutdown method of the fuel cell system according to claim 1, wherein the fuel cell system further comprising:

a current meter which measures an amount of current extracted from the fuel cell by the current extraction device, and the fresh-air control valves are closed when a value measured by the current meter is reduced to not more than a predetermined threshold which is lower than a target value of the amount of current extracted from the fuel cell.

10. The shutdown method of the fuel cell system according to claim 1, wherein the fuel cell system further comprising:

a flow rate detector which detects a flow rate of the oxidant gas supplied to the oxidant electrode, the fresh-air control valves are closed when the flow rate of the oxidant gas detected by the flow rate detector is reduced to not more than a predetermined threshold.

11. The shutdown method of the fuel cell system according to claim 1, further comprising:

after airtightly closing the fresh-air control valves, terminating the extraction of current from the fuel cell by the current extraction device, and stopping the supply of the fuel gas to the fuel electrode.

* * * * *